(12) United States Patent
Shiomi

(10) Patent No.: US 11,011,971 B2
(45) Date of Patent: May 18, 2021

(54) RECTIFYING CIRCUIT AND POWER SUPPLY DEVICE

(71) Applicant: SHARP KABUSHIKI KAISHA, Sakai (JP)

(72) Inventor: Takeshi Shiomi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/968,064

(22) PCT Filed: Jan. 25, 2019

(86) PCT No.: PCT/JP2019/002554
§ 371 (c)(1),
(2) Date: Aug. 6, 2020

(87) PCT Pub. No.: WO2019/159655
PCT Pub. Date: Aug. 22, 2019

(65) Prior Publication Data
US 2021/0057980 A1 Feb. 25, 2021

(30) Foreign Application Priority Data
Feb. 19, 2018 (JP) .............................. JP2018-026852

(51) Int. Cl.
*H02M 1/08* (2006.01)
*H02M 7/219* (2006.01)
(Continued)

(52) U.S. Cl.
CPC ............... *H02M 1/08* (2013.01); *H02M 1/38* (2013.01); *H02M 3/1588* (2013.01);
(Continued)

(58) Field of Classification Search
CPC .. H02M 1/08; H02M 1/38; H02M 2001/0054; H02M 3/1588; H02M 7/219; H02M 7/5387; H02M 7/53871
(Continued)

(56) References Cited

U.S. PATENT DOCUMENTS 7,408,399 B2 * 8/2008 Salato .............. H03K 17/04123
326/82
10,536,070 B1 * 1/2020 Penzo .................. H03K 17/063
(Continued)

FOREIGN PATENT DOCUMENTS

JP 4557015 B2 10/2010

OTHER PUBLICATIONS

D. Polenov et al., "Influence of parasitic inductances on transient current sharing in parallel connected synchronous rectifiers and Schottky-barrier diodes", IET Circuits Devices Systems, vol. 1, No. 5, Oct. 2007.

*Primary Examiner* — William Hernandez
(74) *Attorney, Agent, or Firm* — ScienBiziP, P.C.

(57) ABSTRACT

A rectifying circuit includes a HEMT, a diode connected in antiparallel to the HEMT; and a gate drive circuit, wherein the gate drive circuit includes a gate drive power supply, a first transistor, a second transistor configured to turn on in a complementary manner with the first transistor, a first capacitor including an input capacitance of the HEMT, a second capacitor provided on a pathway configured to charge the input capacitance, a first resistor connected in parallel to the first capacitor, and a second resistor connected in parallel to the second capacitor, the gate drive circuit is configured to control a gate voltage of the HEMT to make the gate voltage lower than a source voltage of the HEMT when the HEMT is turned off.

6 Claims, 14 Drawing Sheets

(51) Int. Cl.
*H02M 1/38* (2007.01)
*H02M 3/158* (2006.01)
*H02M 7/5387* (2007.01)
*H02M 1/00* (2006.01)

(52) U.S. Cl.
CPC ....... *H02M 7/219* (2013.01); *H02M 7/53871* (2013.01); *H02M 2001/0054* (2013.01)

(58) Field of Classification Search
USPC .................................. 327/108, 109, 110, 111
See application file for complete search history.

(56) References Cited

U.S. PATENT DOCUMENTS

2009/0206812 A1    8/2009  Sasaya et al.
2019/0229604 A1*   7/2019  Hirose .............. H02M 3/33592

* cited by examiner

RECTIFYING CIRCUIT AND POWER SUPPLY DEVICE

TECHNICAL FIELD

The disclosure relates to a switching power supply device, and more particularly relates to a rectifying circuit including a high electron mobility transistor (HEMT) as a switching element, and a power supply device using the same.

BACKGROUND ART

Switching power supply devices are widely used as power supply devices for electronic equipment. For example, a metal oxide semiconductor field effect transistor (MOSFET) is used as a switching element included in a switching power supply device. A diode having a PN junction parasitically exists between the drain and the source of the MOSFET. When a current flows through the parasitic diode, charge is accumulated in the PN junction and a reverse recovery current flows. Due to this, a switching power supply device using a MOSFET has a problem that switching loss is increased by the flow of the reverse recovery current.

PTL 1 describes a power switching circuit as a power supply circuit in which switching loss is reduced. In the stated power switching circuit, a second diode is disposed in parallel to a first diode that is connected in antiparallel to a semiconductor switching element so that a reverse recovery current is reduced by magnetic energy accumulated in a current pathway extending through the second diode. A similar circuit is described also in NPL 1.

A transistor using a compound semiconductor is known as a transistor without a parasitic diode. Hereinafter, attention is given to a HEMT, which is a type of transistor using a compound semiconductor. The HEMT is an N-channel transistor taking a two-dimensional electron gas as a channel, and does not contain a parasitic diode having a PN junction. Thus, in the HEMT, no charge is accumulated in the PN junction and no reverse recovery current flows. Accordingly, with a power supply device using a HEMT, switching loss can be significantly reduced.

CITATION LIST

Patent Literature

PTL 1: JP 4557015 B

Non Patent Literature

NPL 1: D. Polenov, et al., "Influence of parasitic inductances on transient current sharing in parallel connected synchronous rectifiers and Schottky-barrier diodes", IET Circuits, Devices & Systems, Volume 1, Issue 5, October 2007

SUMMARY OF INVENTION

Technical Problem

In order to further reduce switching loss in a switching power supply device using a HEMT, switching loss due to charge accumulated in an output capacitance of the HEMT needs to be reduced. Furthermore, in the case of a switching power supply device that performs synchronous rectification, conduction loss in a dead time period needs to be further reduced.

Accordingly, it may be given as an issue to provide a rectifying circuit configured to use a HEMT and in which switching loss is reduced, and to provide a power supply circuit using the rectifying circuit.

Solution to Problem

The above issue may be solved by a rectifying circuit including a high electron mobility transistor (HEMT), a diode connected in antiparallel to the HEMT, and a gate drive circuit. The gate drive circuit includes a gate drive power supply, a first transistor including a first conduction terminal connected to a positive electrode of the gate drive power supply and a second conduction terminal connected to a first node, a second transistor including a first conduction terminal connected to the first node and a second conduction terminal connected to a negative electrode of the gate drive power supply and a source terminal of the HEMT and configured to turn on in a complementary manner with the first transistor, a first capacitor including an input capacitance of the HEMT, and provided between a gate terminal and the source terminal of the HEMT, a second capacitor provided on a pathway extending through the first node and configured to charge the input capacitance, a first resistor connected in parallel to the first capacitor, and a second resistor connected in parallel to the second capacitor. A forward voltage drop of the diode when the diode starts to be conductive is smaller than a voltage drop of the HEMT when the HEMT is reverse-conductive in an OFF state corresponding to an amount of rectified current when the HEMT is reverse-conductive in an ON state. Inductance of a pathway extending through the diode is larger than inductance of a pathway extending through the HEMT among the pathways connecting the source terminal and a drain terminal of the HEMT. An amount of charge accumulated in a parasitic capacitance of the diode is smaller than an amount of charge accumulated in an output capacitance of the HEMT. The gate drive circuit is configured to control a gate voltage of the HEMT to make the gate voltage lower than a source voltage of the HEMT when the HEMT is turned off. The above issue may also be solved by a power supply circuit equipped with such a rectifying circuit.

Advantage Effects of Invention

According to the rectifying circuit described above, the gate drive circuit can be used to control the difference between the gate voltage and the source voltage of the HEMT to make the difference instantaneously change from 0 V to a first voltage when the HEMT is turned on, curvilinearly change from the first voltage to a second voltage in the period in which the HEMT is in an ON state, instantaneously change from the second voltage to a third voltage when the HEMT is turned off, and change from the third voltage to 0 V in the period in which the HEMT is in an OFF state. The first to third voltages are determined by the power supply voltage, the capacitance values of the two capacitors, and one or both of the resistance values of the two resistors. Accordingly, by suitably determining the capacitance values and the resistance values, it is possible to control the difference between the gate voltage and the source voltage of the HEMT to a desired level immediately after the HEMT is turned on, immediately before the HEMT is turned off, and immediately after the HEMT is turned off and reduce switching loss. Moreover, according to the power supply circuit provided with the rectifying circuit described above, it is possible to constitute a power supply circuit with reduced switching loss by using a rectifying circuit in which switching loss is reduced.

DESCRIPTION OF EMBODIMENTS

A rectifying circuit according to embodiments will be described hereinafter with reference to the drawings. As described later, the rectifying circuit according to the embodiments includes a high electron mobility transistor (HEMT), a diode connected in antiparallel to the HEMT, and a gate drive circuit configured to control a gate voltage of the HEMT. Before description is made of the rectifying circuit according to the embodiments, rectifying circuits according to reference examples will be described.

First Reference Example

Figure 1:
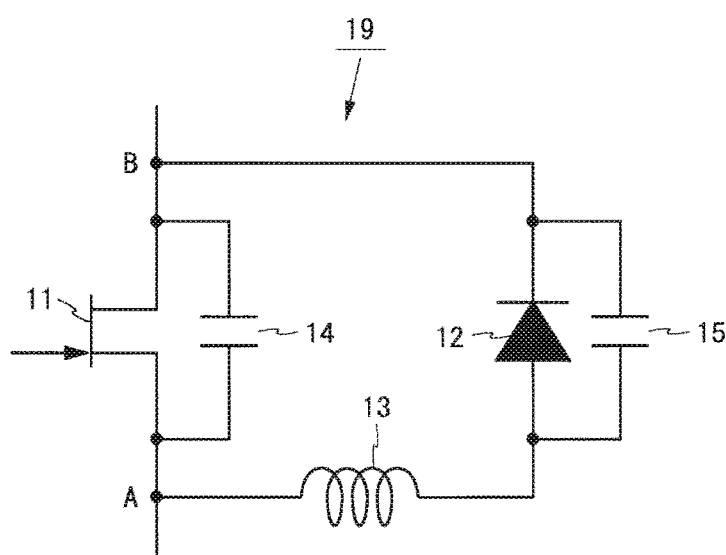
FIG. 1 is a circuit diagram of a rectifying circuit according to a first reference example.

FIG. 1 is a circuit diagram of a rectifying circuit according to a first reference example. A rectifying circuit 19 illustrated in FIG. 1 includes a HEMT 11 and a diode 12. An anode terminal of the diode 12 is connected to a source terminal of the HEMT 11, and a cathode terminal of the diode 12 is connected to a drain terminal of the HEMT 11. As described above, the diode 12 is connected in antiparallel to the HEMT 11. Note that an element that does not interrupt operation of the rectifying circuit 19 may be provided on a pathway that connects the diode 12 in antiparallel to the HEMT 11. Hereinafter, a situation in which the HEMT 11 allows a current to flow from the source terminal to the drain terminal is referred to as being reverse-conductive, and a current that flows at the time of being reverse-conductive is referred to as a reverse-direction current. As illustrated in FIG. 1, two points A and B are set.

In the following description, the HEMT 11 is a HEMT made of gallium nitride (hereinafter referred to as a GaN-HEMT), and the diode 12 is a Schottky barrier diode made of silicon carbide (hereinafter referred to as a SiC-SBD). More specifically, the HEMT 11 is considered to be a GaN-HEMT, where the rated voltage between the drain and the source is a class of 650 V with 60 A, on-resistance is 25 mΩ (junction temperature Tj=25° C.), and a threshold voltage is 2 V, and the diode 12 is considered to be a SiC-SBD product, where the rated voltage is a class of 650 V with DC 6 A (case temperature Tc=25° C.).

A GaN-HEMT is suitable for the rectifying circuit 19 because it has a higher dielectric breakdown strength than a silicon transistor and has low resistance. A SiC-SBD is suitable for the rectifying circuit 19 because it does not generate a reverse recovery current and has a high withstand voltage. A gallium arsenide (GaAs)-based HEMT, an indium phosphorus (InP)-based HEMT, or a silicon-germanium (SiGe)-based HEMT may be used as the HEMT 11. A fast recovery diode (FRD) or a Schottky barrier diode made of silicon may be used as the diode 12. A GaN-HEMT has a smaller output capacitance than that of a silicon transistor and a silicon carbide transistor, which is advantageous. When a diode is connected in antiparallel to a GaN-HEMT with a small output capacitance, the capacitance is increased so that the advantage described above is lost.

The rectifying circuit 19 has the following features. First, a forward voltage drop of the diode 12 when the diode 12 starts to be conductive is smaller than a voltage drop of the HEMT 11 when the HEMT 11 is reverse-conductive in an OFF state corresponding to an amount of rectified current when the HEMT 11 is reverse-conductive in an ON state. Second, inductance of a pathway extending through the diode 12 is larger than inductance of a pathway extending through the HEMT 11 among the pathways connecting the source terminal and the drain terminal of the HEMT 11. Third, an amount of charge accumulated in a parasitic capacitance of the diode 12 is smaller than an amount of charge accumulated in an output capacitance of the HEMT 11.

The HEMT 11 is reverse-conductive, and a rectified current flows through the rectifying circuit 19 in the upward direction in the drawing. At this time, the point A functions as a branch point of the rectified current, and the point B functions as a meeting point of the rectified current. Between the source and drain terminals of the HEMT 11, there exist a pathway extending through the HEMT 11 and a pathway extending through the diode 12. In the rectifying circuit 19, the inductance of the pathway extending through the diode 12 is larger than the inductance of the pathway extending through the HEMT 11 (second feature). For example, when the inductance of the pathway extending through the HEMT 11 is 5 nH, the inductance of the pathway extending through the diode 12 is 50 nH. To represent this feature, an inductor 13 is illustrated on the pathway extending through the diode 12 in the drawings. The inductor 13 is introduced for representing a magnitude relationship between the inductances of the two pathways and does not necessarily need to be an inductor element.

The HEMT 11 has an output capacitance 14, and the diode 12 has a parasitic capacitance 15. The output capacitance 14 of the HEMT 11 includes capacitance between the drain and the source, and capacitance between the drain and the gate. Since the latter is smaller than the former, the latter is omitted in the drawing. The parasitic capacitance 15 of the diode 12 is capacitance between the anode and the cathode.

The rectified current flowing through the rectifying circuit 19 is, for example, a rectangular wave that is induced by using an inductor. When no rectified current flows, a high voltage is applied to the point B based on the point A. In the following description, it is considered that the rectified current is a rectangular wave that varies in a range from 0 A to 20 A, and that a voltage of 400 V is applied to the point B based on the point A when no rectified current flows.

The silicon transistor has a prescribed withstand voltage performance when a voltage in a prescribed direction is applied thereto, but easily becomes conductive when a voltage in the reverse direction is applied thereto. For example, the silicon transistor has a prescribed withstand voltage performance when a positive voltage is applied to the drain terminal based on the source terminal, but easily becomes conductive when a positive voltage is applied to the source terminal based on the drain terminal. This is because, when a voltage in the reverse direction is applied, a parasitic diode connected in antiparallel to the silicon transistor becomes conductive. To achieve the above-mentioned performance of the GaN-HEMT (class of 650 V with 60 A, on-resistance of 25 mΩ) by using a silicon transistor, a low resistance silicon transistor called a super junction metal oxide semiconductor (SJMOS) needs to be used.

Figure 2:
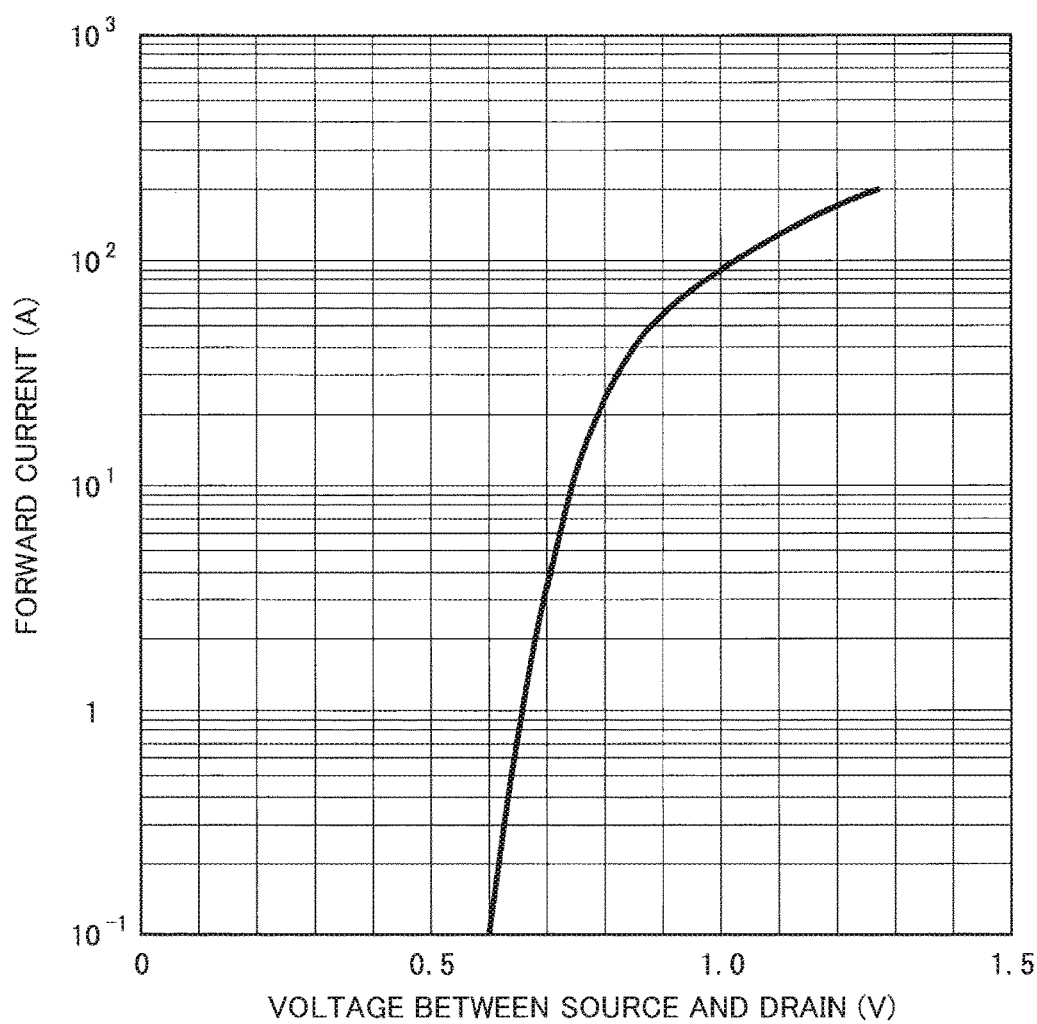
FIG. 2 is a characteristic diagram of a parasitic diode of an SJMOS.

FIG. 2 is a characteristic diagram of a parasitic diode of an SJMOS. In FIG. 2, the horizontal axis represents a voltage between the source and the drain (forward voltage drop), and the vertical axis represents a forward current. In the example illustrated in FIG. 2, the forward voltage drop is about 0.7 V when the current is 2 A, and the forward voltage drop is about 0.8 V when the current is 20 A. As discussed above, the forward voltage drop of the parasitic diode of the silicon transistor is too small to be used in the rectifying circuit 19. In a case where a silicon transistor having the characteristics illustrated in FIG. 2 is used in place of the HEMT 11 in the rectifying circuit 19, it is necessary for the forward voltage drop of the diode 12 to be smaller than 0.8 V in order to flow a current through the diode 12. However, diodes having such characteristics do not actually exist.

Since the HEMT 11 does not have a parasitic diode, a voltage drop due to a parasitic diode does not occur in the HEMT 11. On the other hand, since the HEMT 11 has a horizontal structure (a structure in which the source electrode, the gate electrode, and the drain electrode are formed on the same plane), a voltage drop occurs when the HEMT 11 is reverse-conductive. The voltage drop when the HEMT 11 is reverse-conductive can be made larger than the voltage drop due to the parasitic diode of the silicon transistor.

Figure 3:
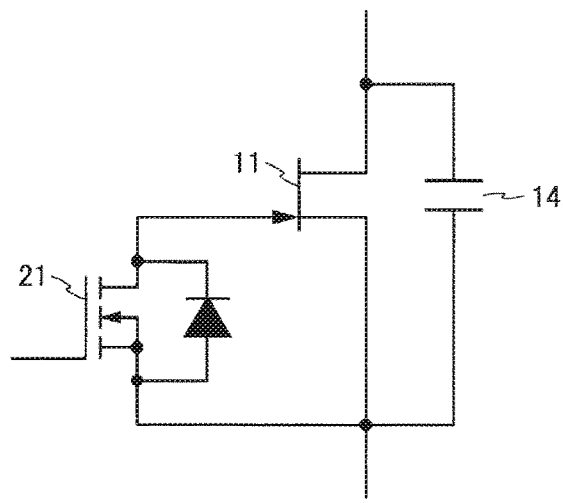
FIG. 3 is a diagram illustrating a method for controlling a gate voltage of a HEMT in the rectifying circuit illustrated in FIG. 1.

FIG. 3 is a diagram illustrating a method for controlling the gate voltage of the HEMT 11. As illustrated in FIG. 3, a transistor 21 is provided between the gate and source terminals of the HEMT 11. A drain terminal of the transistor 21 is connected to the gate terminal of the HEMT 11, and a source terminal of the transistor 21 is connected to the source terminal of the HEMT 11. A resistor or a diode may be provided on a pathway connecting the HEMT 11 and the transistor 21.

When the transistor 21 is turned on, the HEMT 11 gate voltage is controlled to be at the same level as the source voltage. In this state, when a positive voltage (reverse-direction voltage) is applied to the source terminal of the HEMT 11 based on the drain terminal thereof, the gate voltage rises along with the source voltage and becomes higher than the drain voltage. When the voltage between the gate and the drain rises up to the vicinity of the threshold voltage of the HEMT 11, the HEMT 11 becomes reverse-conductive. In the case where the HEMT 11 has a positive threshold voltage, short-circuiting the gate and source terminals of the HEMT 11 and causing the HEMT 11 to be reverse-conductive increases the voltage drop of the HEMT 11 during reverse-conduction and makes it easier for a current to flow through the diode 12.

Figure 4:
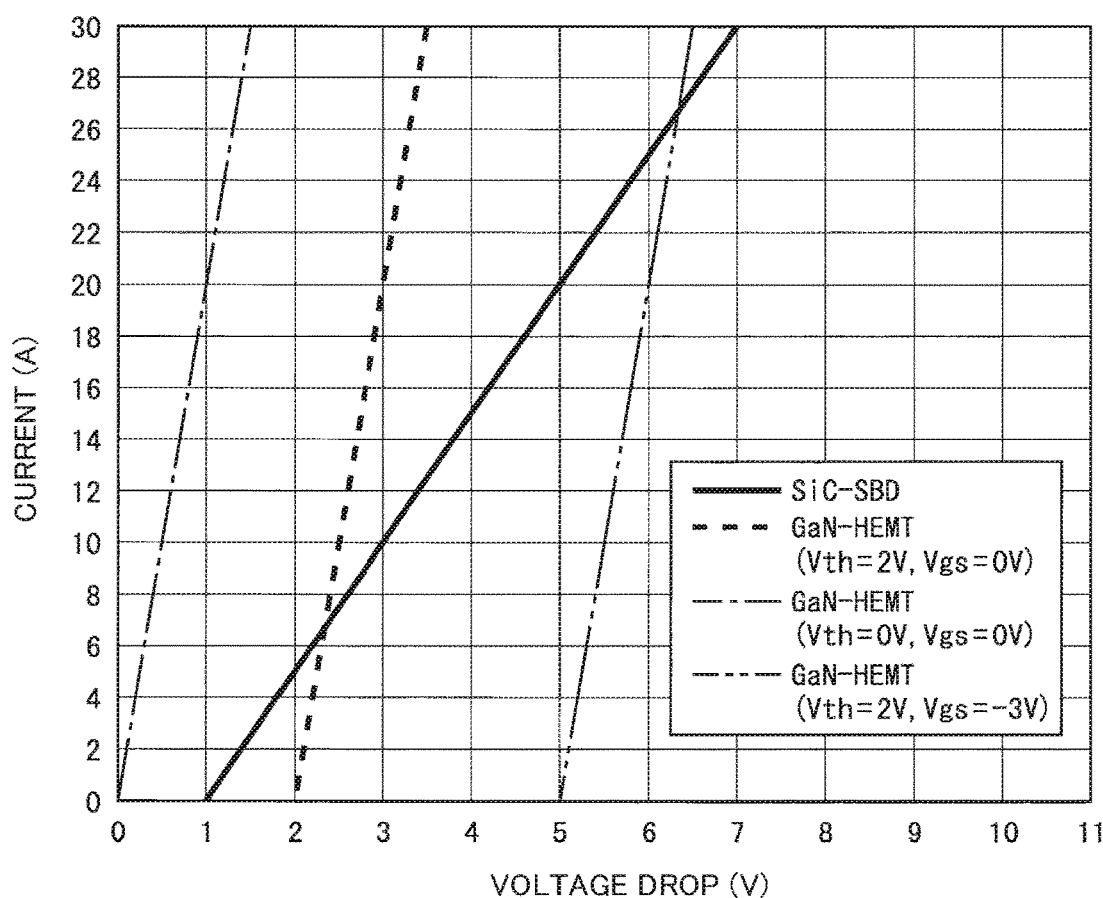
FIG. 4 is a characteristic diagram of a GaN-HEMT and a SiC-SBD.

FIG. 4 is a characteristic diagram of a GaN-HEMT and a SiC-SBD. In FIG. 4, the vertical axis represents a current flowing through the GaN-HEMT or SiC-SBD, and the horizontal axis represents a voltage drop of the GaN-HEMT during reverse-conduction or a forward voltage drop of the SiC-SBD. A solid line shows characteristics of the SiC-SBD according to the present reference example. A broken line shows characteristics of the GaN-HEMT having a threshold voltage of 2 V according to the present reference example. A dot-dash line shows characteristics of the GaN-HEMT having a threshold voltage of 0 V. The characteristics shown by the broken and dot-dash lines are characteristics when the voltage between the gate and the source is 0 V (characteristics when the GaN-HEMT is in the OFF state). A double-dot dash line will be described in a second reference example. The slope of each line indicates a resistive component of the element. The four lines illustrated in FIG. 4 linearly approximate actual measurement data.

The HEMT having a threshold voltage of 0 V becomes reverse-conductive at a lower voltage than the HEMT having a threshold voltage of 2 V. A normally-on type HEMT (not illustrated) becomes reverse-conductive at a lower voltage than the HEMT having a threshold voltage of 0 V. As the voltage at which the HEMT starts to be reverse-conductive reduces, a voltage drop of the HEMT becomes smaller during the reverse conduction.

In the present reference example, in order to increase the voltage drop during the reverse-conduction, a HEMT having a positive threshold voltage is used as the HEMT 11. However, when the threshold voltage of the HEMT 11 is too high, the loss due to the voltage drop increases. Therefore, it is preferable for the threshold voltage of the HEMT 11 to be equal to or higher than 0.5 V and equal to or lower than 5 V, and more preferable to be equal to or higher than 1 V and equal to or lower than 3 V.

As indicated by the broken line in FIG. 4, the voltage drop during the reverse-conduction of the GaN-HEMT having a threshold voltage of 2 V is about 2.1 V when the current is 2 A and is about 3.0 V when the current is 20 A. Since the voltage drop during the reverse-conduction of the HEMT 11 is larger than a voltage drop due to the parasitic diode of the silicon transistor, a current is likely to flow through the diode 12 during the reverse-conduction of the HEMT 11. By controlling the HEMT 11 gate voltage to be at the same level as the source voltage by using the transistor 21 as described above, the voltage drop of the HEMT 11 during the reverse-conduction can be increased.

As indicated by the solid line in 4, the forward voltage drop is 1 V when the SiC-SBD starts to be conductive. The forward voltage drop of the SiC-SBD is about 1.4 V when the current is 2 A, and is about 5.0 V when the current is 20 A. The forward voltage drop of the SiC-SBD is small when the current is small, but is larger than the voltage drop of the GaN-HEMT during the reverse-conduction when the current is equal to or larger than a prescribed current. The SiC-SBD becomes conductive at a low voltage, but as the current increases, the forward voltage drop of the SiC-SBD significantly increases due to the influence of a resistive component.

In the rectifying circuit 19, it is most preferable that, within a range of the current used, the forward voltage drop of the diode 12 be smaller than the voltage drop of the HEMT 11 during the reverse-conduction. In the example illustrated in FIG. 4, it is most preferable that the above condition be satisfied in a range from 0 A to 20 A. Simply considering, it seems to be sufficient that the resistance of the diode 12 is reduced. However, reducing the resistance of the diode 12 increases the parasitic capacitance 15 of the diode 12 so that the charge accumulated in the parasitic capacitance 15 is increased. Thus, in the rectifying circuit 19, it is required that the amount of charge accumulated in the parasitic capacitance 15 of the diode 12 is smaller than the amount of charge accumulated in the output capacitance 14 of the HEMT 11 (third feature). Accordingly, the parasitic capacitance 15 having influence on the above condition (forward voltage drop) may not be unconditionally reduced. In other words, the resistive component having influence on the parasitic capacitance 15 may not be unconditionally reduced. The solid line illustrated in FIG. 4 is set in such a manner that the resistance of the diode 12 does not become too high while causing the amount of charge accumulated in the parasitic capacitance 15 of the diode 12 to be small as much as possible.

In order to reduce switching loss in the rectifying circuit 19, it is required that the forward voltage drop of the diode 12 when the diode 12 starts to be conductive is smaller than the voltage drop of the HEMT 11 when the HEMT 11 is reverse-conductive in the OFF state corresponding to the amount of rectified current when the HEMT 11 is reverse-conductive in the ON state (first feature). In the example described above, the forward voltage drop when the diode 12 starts to be conductive is 1.0 V, the amount of rectified current when the HEMT 11 is reverse-conductive in the ON state is 20 A, and the voltage drop when the HEMT 11 is reverse-conductive in the OFF state corresponding to the above 20 A is approximately 3.0 V. Accordingly, the rectifying circuit 19 has the first feature.

It is preferable that the rectifying circuit 19 have, in addition to the first to third features, a feature (fourth feature) in which the forward voltage drop of the diode 12 corresponding to 10% of the amount of rectified current when the HEMT 11 is reverse-conductive in the ON state is smaller, by equal to or larger than 0.2 V, than the voltage drop of the HEMT 11 when the HEMT 11 is reverse-conductive in the OFF state corresponding to the amount of rectified current when the HEMT 11 is reverse-conductive in the ON state.

When a difference in voltage drop is equal to or greater than 0.5 V, the switching loss may be more effectively reduced. On the other hand, when the difference in voltage drop is equal to or greater than 10 V, since the voltage drop of the former is equal to or greater than 10 V, the loss due to the current flowing through the HEMT 11 is increased. Therefore, it is preferable for the difference in voltage drop to be equal to or greater than 0.2 V and equal to or smaller than 10 V, and more preferable to be equal to or greater than 0.5 V and equal to or smaller than 10 V. In the above example, the forward voltage drop of the SiC-SBD corresponding to 2 A is about 1.4 V, while the voltage drop of the GaN-HEMT corresponding to 20 A is about 3.0 V. Accordingly, the rectifying circuit 19 has the fourth feature. In this case, it is sufficient that the forward voltage drop of the SiC-SBD corresponding to 2 A is equal to or smaller than 2.8 V.

The inductor 13 will be described below. In the rectifying circuit 19, the inductor 13 is provided on the pathway extending through the diode 12. Since the rectifying circuit 19 has the first feature, some of the current that flows through the HEMT 11 when the HEMT 11 is reverse-conductive in the ON state flows through the diode 12 after the HEMT 11 is turned off. When this current flows through the inductor 13, magnetic energy is accumulated in the inductor 13. When the inductor 13 is used to charge the output capacitance 14 of the HEMT 11, inductance of the pathway extending through the HEMT 11 interrupts the charging. Therefore, the inductance of the pathway extending through the HEMT 11 is preferably as small as possible.

In order to reduce the switching loss, it is preferable for inductance of the pathway extending through the diode 12 to be twice or more, more preferably 10 times or more, the inductance of the pathway extending through the HEMT 11. It is preferable that the difference in inductance be larger, but in the case where the difference is too large, it takes time when the current is increased. Therefore, the inductance of the pathway extending through the diode 12 is preferably equal to or less than 100 thousand times the inductance of the pathway extending through the HEMT 11. Here, the inductance refers to inductance in the vicinity of a current being 0 A.

The inductor 13 is provided between the point A and the anode terminal of the diode 12 in FIG. 1. However, an inductor may be provided between the point B and the cathode terminal of the diode 12, or inductors may be provided both between the point A and the anode terminal of the diode 12 and between the point B and the cathode terminal of the diode 12. Whichever position is selected for providing the inductor, the same effect can be obtained as long as the inductance is the same.

Hereinafter, the relationship between the amount of charge accumulated in the output capacitance 14 of the HEMT 11 and the amount of charge accumulated in the parasitic capacitance 15 of the diode 12 will be described. The former is the amount of charge that flows when charging the output capacitance 14 to a prescribed voltage, while the latter is the amount of charge that flows when charging the parasitic capacitance 15 to a prescribed voltage. In order to suppress the loss due to the charge accumulated in the parasitic capacitance 15, it is preferable for the amount of charge accumulated in the parasitic capacitance 15 to be as small as possible.

When the amount of charge accumulated in the parasitic capacitance 15 is 70% or greater of the amount of charge accumulated in the output capacitance 14, there arises a problem that the loss due to the charge accumulated in the parasitic capacitance 15 is large. When the amount of charge accumulated in the parasitic capacitance 15 is 0.5% or less of the amount of charge accumulated in the output capacitance 14, there arises a problem that the resistance of the diode 12 is large. Accordingly, it is preferable for the amount of charge accumulated in the parasitic capacitance 15 to be equal to or greater than 0.5% and equal to or less than 70% of the amount of charge accumulated in the output capacitance 14, and more preferable to be equal to or greater than 5% and equal to or less than 30% thereof. In the above example, when the voltage is 400 V, the amount of charge accumulated in the GaN-HEMT output capacitance is 110 nC, and the amount of charge accumulated in the SiC-SBD parasitic capacitance is 8 nC. In this case, the amount of charge accumulated in the parasitic capacitance 15 is within a preferred range, that is, is approximately 7% of the amount of charge accumulated in the output capacitance 14.

Figure 5:
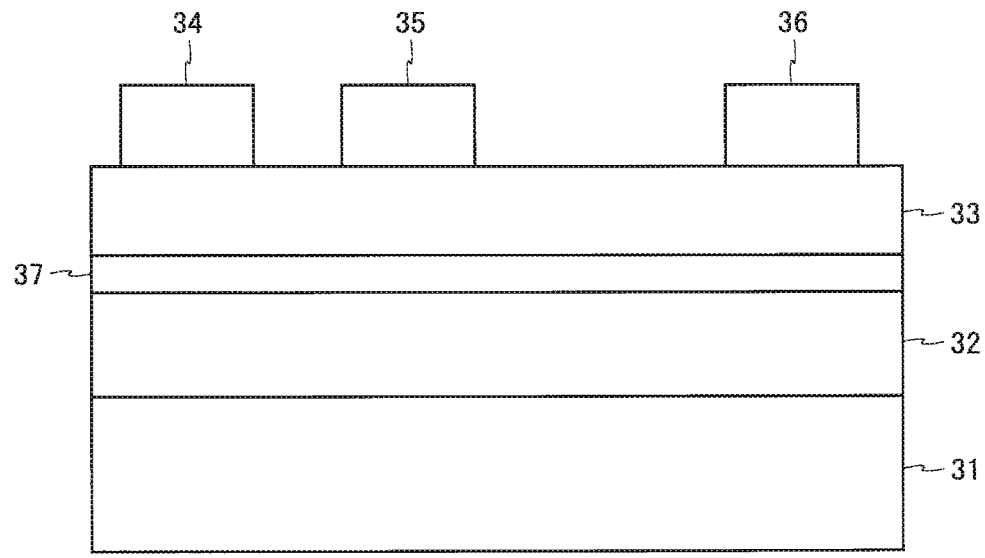
FIG. 5 is a cross-sectional view of a GaN-HEMT.

FIG. 5 is a cross-sectional view of a GaN-HEMT. As illustrated in FIG. 5, the GaN-HEMT has a structure in which a GaN layer 32 and an AlGaN layer 33 are formed on a silicon substrate 31, and a source electrode 34, a gate electrode 35, and a drain electrode 36 are disposed side by side on these layers. A two-dimensional electron gas layer 37 is formed between the GaN layer 32 and the AlGaN layer 33. The silicon substrate 31 is doped to be an N-type and functions as a conductive layer. The two-dimensional electron gas layer 37 under the gate electrode 35 is depleted when a voltage between the gate and the source is 0 V. The silicon substrate 31 and the source electrode 34 are electrically connected to each other by a connection method (not illustrated). A buffer layer may be provided between the silicon substrate 31 and the GaN layer 32.

In the GaN-HEMT, a conductive layer (the silicon substrate 31) is present in a lower layer relative to the two-dimensional electron gas layer 37, and the conductive layer and the source electrode 34 are electrically connected. Therefore, electrostatic capacitance is formed between the drain electrode 36 and the conductive layer having the same voltage as the source electrode 34. Electrostatic capacitance is also formed between the conductive layer and the two-dimensional electron gas layer 37 connected to the drain electrode 36. Since these two electrostatic capacitances are newly formed in this manner, the output capacitance of the GaN-HEMT is increased.

Even when the conductive layer and the source electrode 34 are not electrically connected, electrostatic capacitance is formed between the conductive layer and the source electrode 34, and between the conductive layer and the drain electrode 36. Therefore, it is difficult to completely eliminate the effect of providing the conductive layer. This point is less problematic when a distance between the conductive layer and the two-dimensional electron gas layer 37 is equal to or longer than 200 μm, but is problematic when the distance is equal to or shorter than 50 μm, and there arises a big problem when the distance is equal to or shorter than 10 μm.

Figure 6:
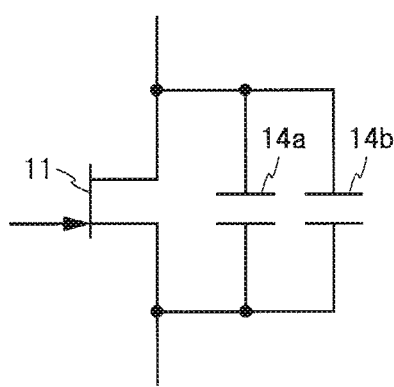
FIG. 6 is a diagram illustrating details of an output capacitance of the HEMT illustrated in FIG. 1.

FIG. 6 is a diagram illustrating details of the output capacitance 14 of the HEMT 11. As illustrated in FIG. 6, the output capacitance 14 includes an output capacitance 14a as a general capacitance, and an output capacitance 14b produced due to the conductive layer. In the drawings other than the drawing in FIG. 6, the two output capacitances 14a and 14b are collectively described as a single output capacitance 14. The conductive layer of the HEMT is not limited to an N-type doped silicon substrate; that is, the same result is also achieved by using a P-type doped silicon substrate or by using another member having conductivity.

Figure 7:
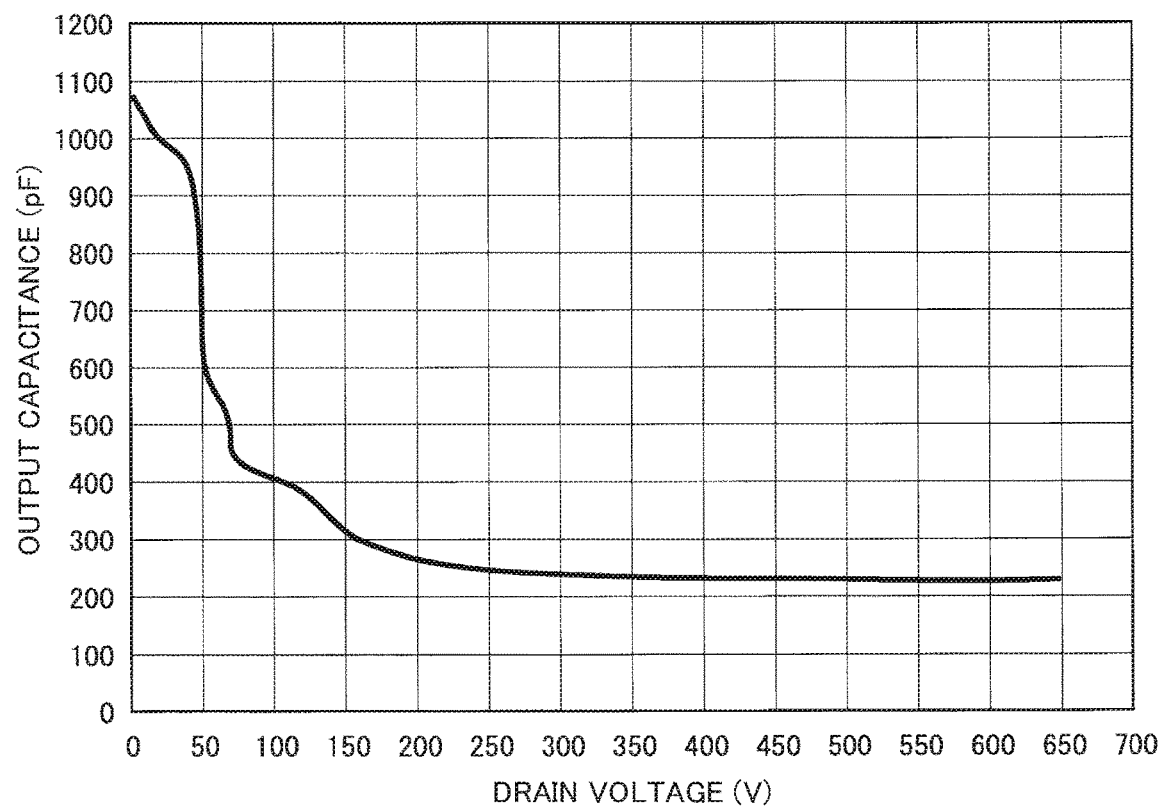
FIG. 7 is a characteristic diagram of a GaN-HEMT.

FIG. 7 is a characteristic diagram of a GaN-HEMT. In FIG. 7, the horizontal axis represents the drain voltage, and the vertical axis represents the output capacitance. In this example, the rated voltage of the GaN-HEMT is 650 V. As illustrated in FIG. 7, the output capacitance of the GaN-HEMT varies in accordance with the drain voltage. The output capacitance becomes larger as the drain voltage is lower, and becomes particularly large when the drain voltage is equal to or lower than a prescribed value (in this case, 50 V).

Figure 8:
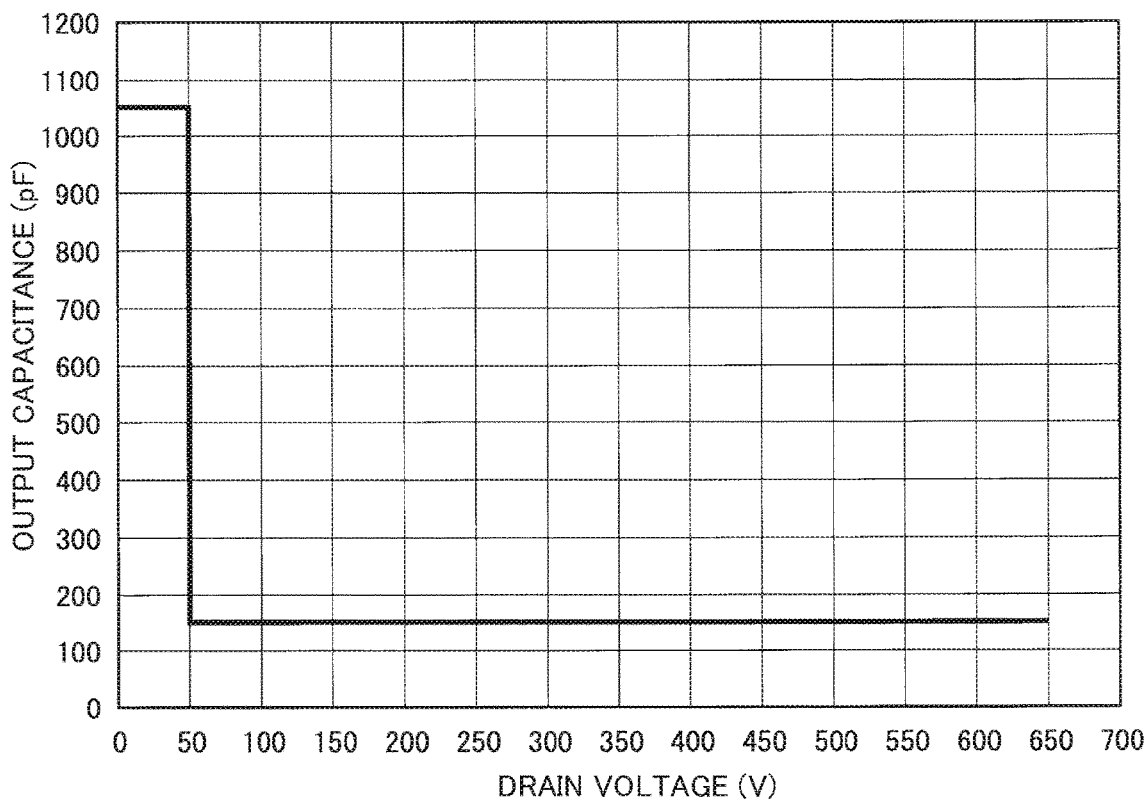
FIG. 8 is a diagram illustrating modeling characteristics of a GaN-HEMT.

FIG. 8 is a diagram illustrating modeled characteristics of the GaN-HEMT. The characteristics illustrated in FIG. 8 are obtained by linearly approximating the characteristics illustrated in FIG. 7. Hereinafter, for facilitation of explanation, the GaN-HEMT is considered to have the characteristics illustrated in FIG. 8. A rectifying circuit including the HEMT 11 and including none of the diode 12 and the inductor 13 is referred to as a rectifying circuit according to a comparative example.

In the rectifying circuit according to the comparative example, loss is generated when the output capacitance 14 of the HEMT 11 is charged. In particular, loss is likely to be generated when the output capacitance 14 is charged at a high voltage (a voltage of 400 V applied to the drain terminal of the HEMT 11). Most of the loss is generated when the voltage of the output capacitance 14 is low in the initial stage of charging. Since the output capacitance 14 of the HEMT 11 is large when the voltage is low (see FIG. 8), a rise in voltage of the output capacitance 14 is slow in the initial stage of charging and the period in which the voltage is low continues for a long time, so that the loss becomes larger. The charge that flows when the voltage of the output capacitance 14 is low generates a larger loss than the charge that flows when the voltage of the output capacitance 14 is high.

In the rectifying circuit 19 according to the present reference example, the diode 12 and the inductor 13 charge the output capacitance 14 of the HEMT 11 when the voltage of the output capacitance 14 is low. The inductor 13 generates a low voltage when the voltage of the output capacitance 14 is low, and uses this voltage to charge the output capacitance 14 of the HEMT 11. Thus, the loss may be effectively reduced for the GaN-HEMT, which exhibits such characteristics that the output capacitance is larger as the voltage is lower.

In order to obtain the effect described above, it is preferable for the average of the output capacitance 14 of the HEMT 11, when the drain voltage of the HEMT 11 falls within a range from 0% to 10% of the rated voltage, to be twice or more, more preferably four times or more, the output capacitance 14 of the HEMT 11 when the drain voltage of the HEMT 11 takes the rated voltage.

In the example illustrated in FIG. 8, the output capacitance is 1050 pF when the drain voltage is in a range from 0 V to 50 V, and the output capacitance is 150 pF when the drain voltage is in a range from 50 V to 650 V. The average of the output capacitance is 840 pF when the drain voltage falls within a range from 0% to 10% of the rated voltage (a range from 0 V to 65 V). The average of the output capacitance may be said to be a more preferable value because it is 5.6 times the output capacitance when the drain voltage takes the rated voltage.

Operations of the rectifying circuit 19 will be described below. First, a positive voltage is applied to the point A based on the point B. At this time, the rectifying circuit 19 becomes reverse-conductive to flow a prescribed amount of rectified current. The HEMT 11 is turned on after the rectified current starts to flow. The rectified current flows through the HEMT 11 while the HEMT 11 is in the ON state. The HEMT 11 is turned off before the flow of the rectified current is stopped. Since the rectifying circuit 19 has the first feature, after the HEMT 11 is turned off, part of the rectified current flows passing through the diode 12. The rectified current eventually branches and flows on two pathways in accordance with resistance and rising voltage characteristics of the elements. For example, a rectified current of 20 A branches into a current of 12 A flowing through the HEMT 11, and a current of 8 A flowing through the diode 12 and the inductor 13. The latter current causes magnetic energy to be accumulated in the inductor 13. When the current of 20 A flows, the voltage at the point A comes to be approximately 2.6 V based on the point B.

Next, in order to stop the flow of the rectified current, a positive voltage of 400 V is applied to the point B based on the point A. This decreases the rectified current. With the decrease of the rectified current, a voltage is generated in the inductor 13, and a current flows due to the magnetic energy accumulated in the inductor 13, whereby the output capacitance 14 of the HEMT 11 is charged.

In the rectifying circuit according to the comparative example, the output capacitance 14 of the HEMT 11 is charged by a voltage of 400 V applied between the two points A and B. This makes the charge rapidly flow so that the loss due to charging increases. In the case where the output capacitance 14 is charged to 400 V, the charge rapidly flows in the initial stage of charging (when the voltage of the output capacitance 14 is low).

In contrast, in the rectifying circuit 19, the output capacitance 14 of the HEMT 11 is charged by the low voltage generated in the inductor 13. Unlike the rectifying circuit according to the comparative example, the charge does not rapidly flow. Thus, the loss due to charging can be reduced. Since the voltage generated in the inductor 13 automatically matches the voltage of the output capacitance 14, the inductor 13 does not generate a higher voltage than necessary. Thus, according to the rectifying circuit 19, loss in the output capacitance 14 of the HEMT 11 at the start of charging can be reduced.

In the rectifying circuit 19, the output capacitance 14 of the HEMT 11 is charged by the voltage generated in the inductor 13 and the voltage applied between the two points A and B. In the rectifying circuit according to the comparative example, most of the loss due to the charging is generated when the voltage of the output capacitance 14 is low. On the other hand, in the rectifying circuit 19, it is possible to reduce the loss when the voltage of the output capacitance 14 is low. Thus, according to the rectifying circuit 19, even in a case where the output capacitance 14 is charged by using the voltage applied between the two points A and B after the voltage of the output capacitance 14 slightly rises, loss can be reduced in comparison with the rectifying circuit according to the comparative example.

For example, in the case where a voltage of 400 V is applied between the two points A and B, the loss due to charging can be reduced when the output capacitance 14 is charged to 20 V (5% of 400 V) by using the voltage generated in the inductor 13. To achieve the effect of loss reduction, it is only necessary to be able to charge the output capacitance 14 to at least 4 V (1% of 400 V) by using the voltage generated in the inductor 13. Preferably, in the case where the output capacitance 14 is charged to 200 V (50% of 400 V) or greater, the effect of loss reduction is large. The limit to which the output capacitance 14 can be charged is 400 V (100% of 400 V) defined in the circuit specifications.

A case in which the voltage of 400 V is applied between the two points A and B has been described thus far, and the higher the applied voltage is, the larger the effect of loss reduction is. In order to achieve the effect of loss reduction, it is sufficient that the applied voltage is equal to or higher than 100 V. In order to sufficiently achieve the effect of loss reduction, it is preferable for the applied voltage to be equal to or higher than 100 V, and more preferable to be equal to or higher than 350 V. In consideration of the structure of the HEMT 11, the limit of the applied voltage is 1200 V.

As described above, with the rectifying circuit 19 according to the present reference example, by charging the output capacitance 14 of the HEMT 11 by using the inductor 13, it is possible to prevent the charge from rapidly flowing and to reduce the loss due to charging of the output capacitance 14 of the HEMT 11.

Figure 9:
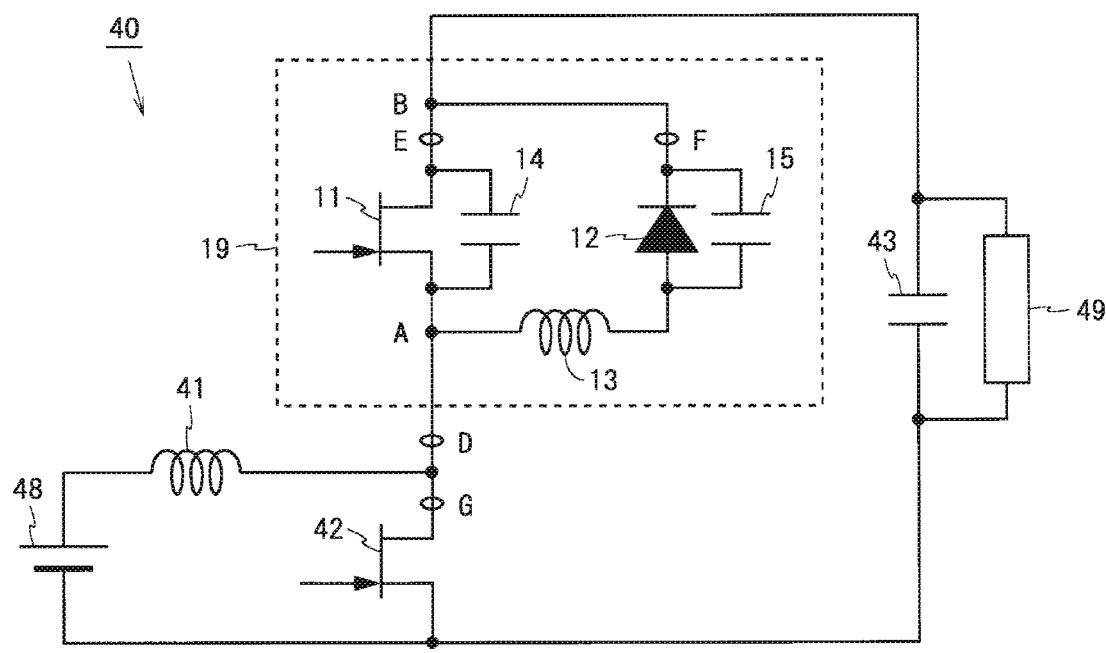
FIG. 9 is a circuit diagram of a power supply circuit (step-up chopper circuit) according to the first reference example.

A power supply circuit including the rectifying circuit 19 will be described below. FIG. 9 is a circuit diagram of a power supply circuit (step-up chopper circuit) according to the present reference example. A step-up chopper circuit 40 illustrated in FIG. 9 includes the rectifying circuit 19, a coil 41, a HEMT 42 and a smoothing capacitor 43, and is connected to a DC power supply 48 and a DC load 49. One end (the left end in FIG. 9) of the coil 41 is connected to a positive electrode of the DC power supply 48. The other end of the coil is connected to a second terminal (a terminal on the lower side in FIG. 9) of the rectifying circuit 19 and to a drain terminal of the HEMT 42. A first terminal of the rectifying circuit 19 is connected to one end (the upper end in FIG. 9) of the DC load 49. A source terminal of the HEMT 42 is connected to a negative electrode of the DC power supply 48 and to the other end of the DC load 49. The smoothing capacitor 43 is disposed between both ends of the DC load 49.

Hereinafter, an output voltage of the DC power supply 48 is 200 V, inductance of the coil 41 is 10 mH, the average of a current flowing through the coil 41 is 20 A, a resistance value of the DC load 49 is 40Ω, electrostatic capacitance of the smoothing capacitor 43 is 10 mF, a voltage across both the ends of the DC load 49 is 400 V, and the HEMT 42 is a GaN-HEMT having the same characteristics as the HEMT 11. The HEMT 42 functions as a switching element.

As illustrated in FIG. 9, a point D, a point E, a point F, and a point G are set. A current flowing through the point D is a current flowing through the rectifying circuit 19. A current flowing through the point E is a current flowing through the HEMT 11. A current flowing through the point F is a current flowing through the diode 12. A current flowing through the point G is a current flowing through the HEMT 42. The current flowing through the point D is the sum of the current flowing through the point E and the current flowing through the point F. The sign of each of the currents flowing through the points D, E, and F is considered to be positive when the current flows upward in the drawing. The sign of the current flowing through the point G is considered to be positive when the current flows downward in the drawing.

Figure 10:
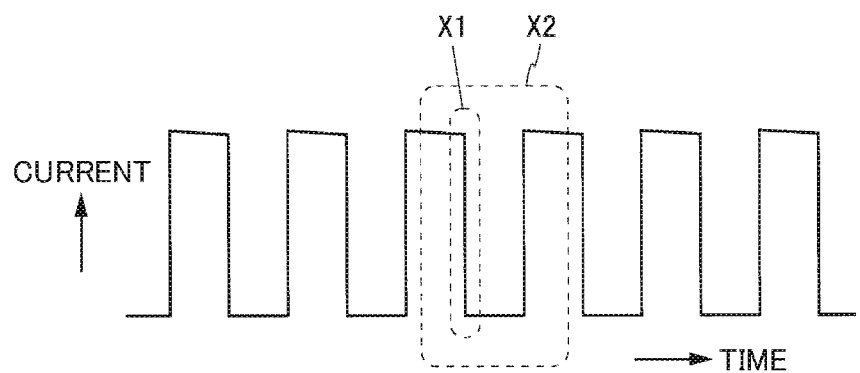
FIG. 10 is a waveform diagram of a current flowing through a point D illustrated in FIG. 9.
Figure 11:
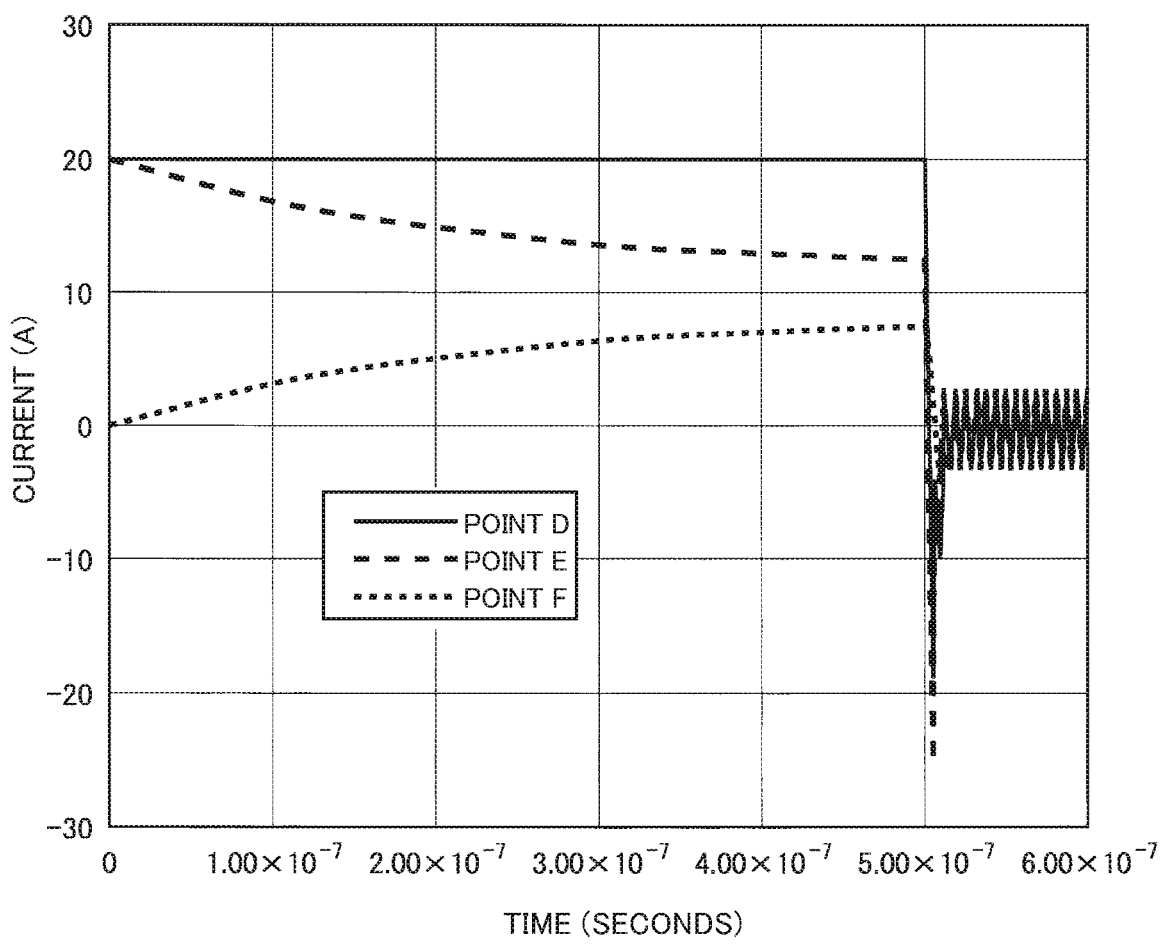
FIG. 11 is a waveform diagram of currents flowing through points illustrated in FIG. 9.
Figure 12:
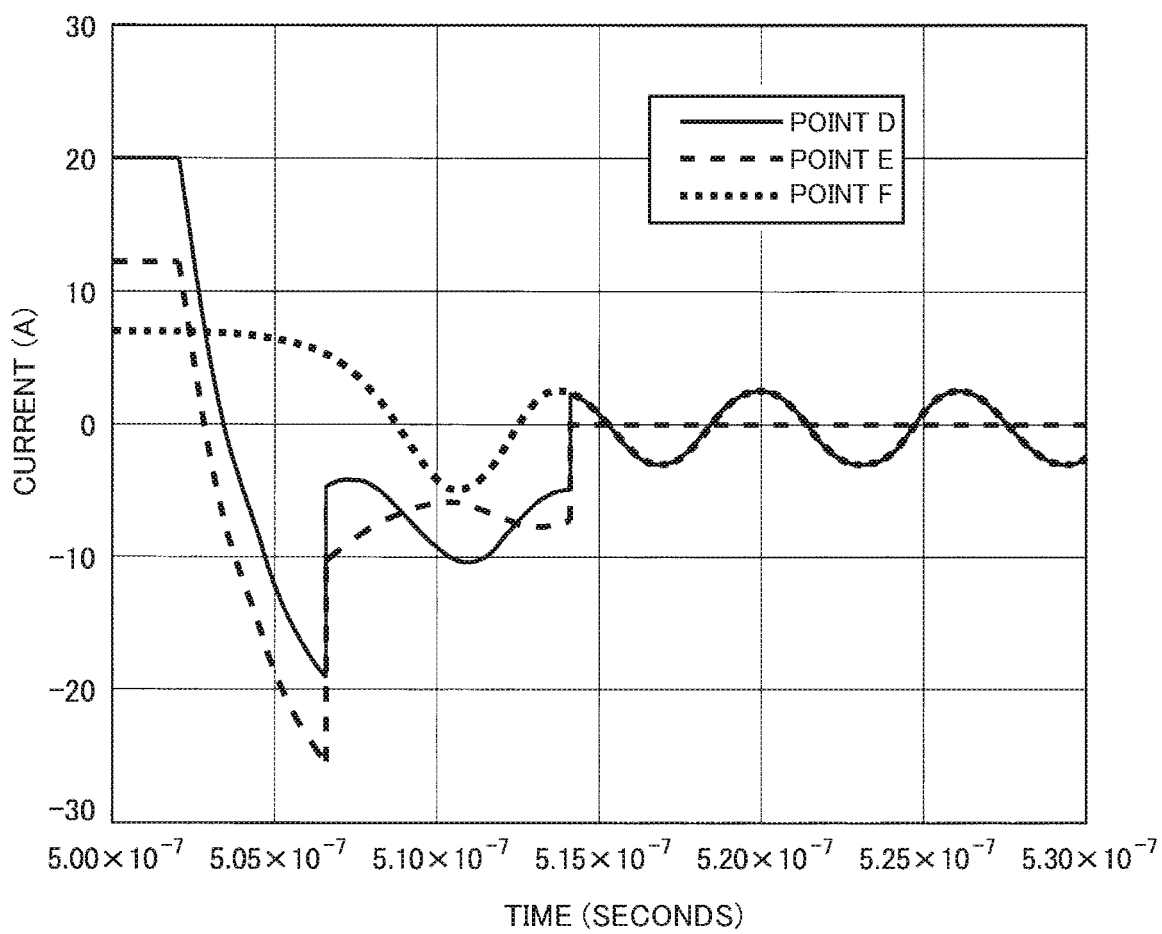
FIG. 12 is an enlarged view of FIG. 11.

FIG. 10 is a waveform diagram of the current flowing through the point D. FIG. 11 is a waveform diagram of the currents flowing through the points D, E, and F. In FIG. 11, a solid line shows a change in the current flowing through the point D, a long-dashed line shows a change in the current flowing through the point E, and a broken line shows a change in the current flowing through the point F. FIG. 11 corresponds to a broken line portion X1 of FIG. 10. FIG. 12 is an enlarged view of FIG. 11 in FIG. 12, a portion of FIG. 11 from $5.00 \times 10^{-7}$ seconds to $5.30 \times 10^{-7}$ seconds is enlarged and illustrated.

The HEMT 42 switches at a prescribed period. When the HEMT 42 is in an ON state, a current flows through the coil 41 and the HEMT 42, and magnetic energy is accumulated in the coil 41. When the HEMT 42 is in an OFF state, the current flows through the coil 41 and the rectifying circuit 19, and the magnetic energy accumulated in the coil 41 is released. A rectified current flowing through the point D forms a rectangular wave as illustrated in FIG. 10, and a voltage obtained by stepping-up the output voltage of the DC power supply 48 is applied to the DC load 49.

The HEMT 11 switches in sync with the HEMT 42. More specifically, the HEMT 11 is turned on after the rectified current starts to flow, and is turned off before the flow of the rectified current is stopped. Further, part of the current that flows passing through the HEMT 11 when the HEMT 11 is in the ON state flows passing through the diode 12 after the HEMT 11 is turned off.

Figure 13:
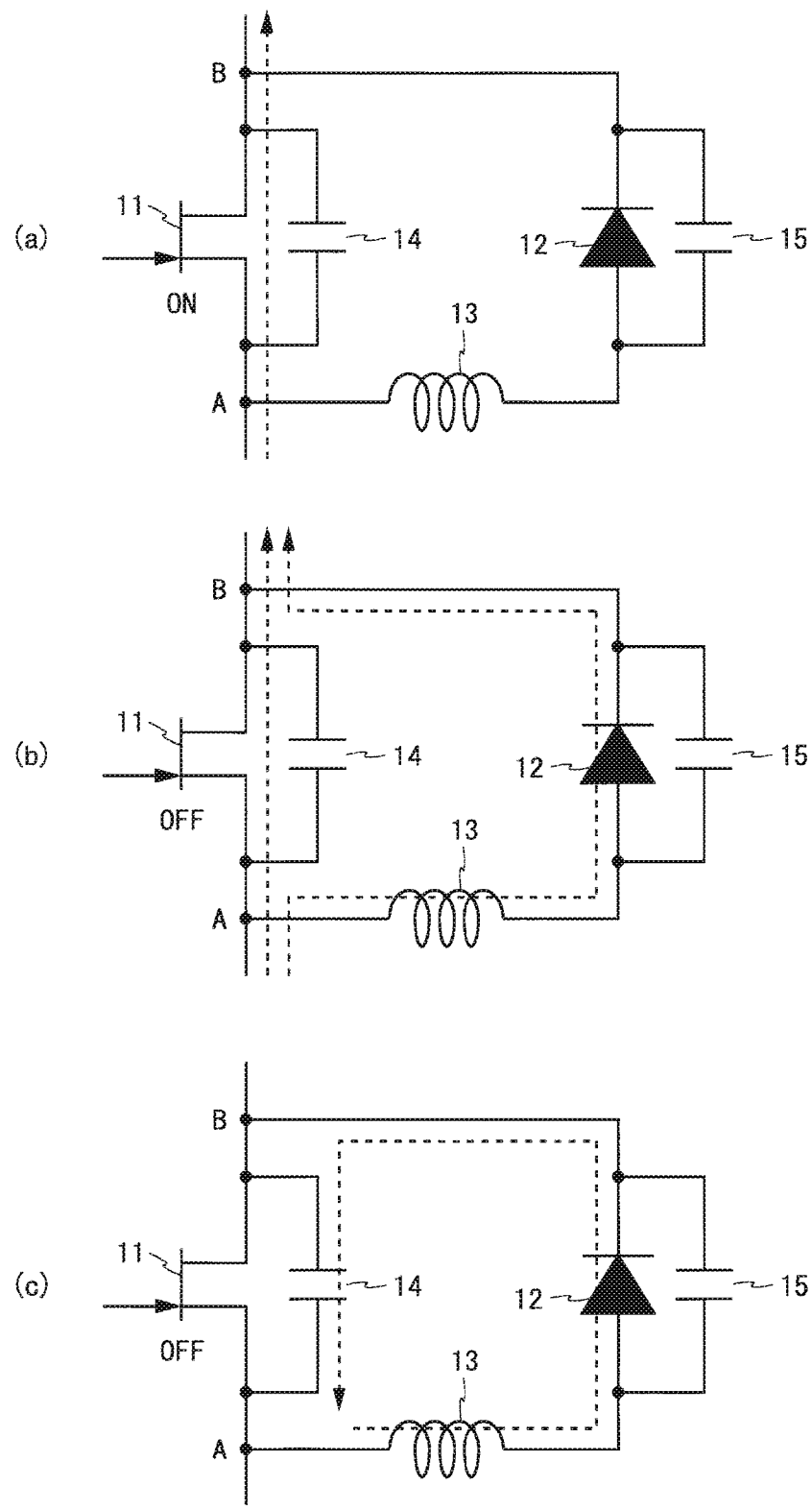
FIG. 13 is a diagram illustrating current pathways in the power supply circuit illustrated in FIG. 9.

FIG. 13 is a diagram illustrating current pathways in the rectifying circuit 19. First, a state is considered in which a rectified current does not flow through the rectifying circuit 19. When a rectified current is not flowing, the voltages of the output capacitance 14 and the parasitic capacitance 15 are high, and charge is accumulated in the output capacitance 14 and the parasitic capacitance 15. When the HEMT 11 is turned on in this state, loss is generated caused by the energy accumulated in the output capacitance 14 and the parasitic capacitance 15. As such, the HEMT 11 is turned on after a rectified current starts to flow through the rectifying circuit 19. When the rectified current flows, the charge accumulated in the output capacitance 14 and the parasitic capacitance 15 is discharged, and the voltages of the output capacitance 14 and the parasitic capacitance 15 are lowered. Thereafter, the HEMT 11 is turned on to make it possible to reduce the loss. In the above example, a situation in which the voltages of the output capacitance 14 and the parasitic capacitance 15 are lowered means that the voltage of 400 V becomes lower than 20% of the stated voltage (voltage of 80 V). It is more preferable that the voltages of the output capacitance 14 and the parasitic capacitance 15 be lower than 5% of the voltage of 400 V (voltage of 20 V).

FIG. 13(*a*) is a diagram illustrating a current pathway when a rectified current is flowing. At this time, a current of 20 A flows through the coil 41, and the current that has passed through the coil 41 is allowed to flow into the rectifying circuit 19 by the electromotive force of the coil 41. In the rectifying circuit 19, a voltage drop is generated corresponding to the current of 20 A. In order to reduce the loss due to the above current, in the rectifying circuit 19, a voltage of 6 V is applied to the gate terminal of the HEMT 11 based on the source terminal of the HEMT 11. This turns on the HEMT 11. The on-resistance of the HEMT 11 during reverse-conduction is about 50 mΩ. Accordingly, the voltage drop at the HEMT 11 is 1.0 V, so that a voltage of 1.0 V is applied to the point A based on the point B. Since the forward voltage drop when the diode 12 starts to be conductive is larger than 1.0 V, most of the current flowing through the rectifying circuit 19 flows through the HEMT 11. By performing synchronous rectification, it is possible to reduce conduction loss in the rectifying circuit 19.

Next, in the rectifying circuit 19, a voltage of 0 V is applied to the gate terminal of the HEMT 11 based on the source terminal of the HEMT 11. At this time, the HEMT 11 is turned off. FIG. 13(*b*) describes a current pathway immediately after the HEMT 11 is turned off. Since a current of 20 A flows through the rectifying circuit 19 after the HEMT 11 is turned off, the voltage drop in the rectifying circuit 19 comes to be 2.6 V (this value is derived from FIG. 4; when the voltage drop is 2.6 V, a current flowing through the HEMT 11 is 12 A, a current flowing through the diode 12 is 8 A, and the sum of the two currents is 20 A). By part of the rectified current flowing through the diode 12, magnetic energy is accumulated in the inductor 13.

Next, in the step-up chopper circuit 40, a voltage of 6 V is applied to the gate terminal of the HEMT 42 based on the source terminal of the HEMT 42. At this time, the HEMT 42 is turned on. In FIG. 13(*c*), a current pathway after the HEMT 42 is turned on is described. When the HEMT 42 is turned on, since a current having passed through the coil 41 flows through the HEMT 42, the rectified current flowing through the point D decreases rapidly. Of the rectified current, a current flowing through the HEMT 11 (a current flowing through the point E) decreases rapidly, while a current flowing through the diode 12 (a current flowing through the point F) decreases at a slower rate than the current flowing through the HEMT 11 due to the action of the inductor 13.

In the example illustrated in FIGS. 11 and 12, the HEMT 11 is in the ON state before 0 seconds. Before 0 seconds, all the rectified current flowing through the rectifying circuit 19 flows through the HEMT 11. At this time, a current flowing through the point D and a current flowing through the point E are 20 A, and a current flowing through the point F is 0 A. The HEMT 11 is turned off at 0 seconds. After $5.00 \times 10^{-7}$ seconds, the current flowing through the HEMT 11 is 12 A and the current flowing through the diode 12 is 8 A. The HEMT 42 is turned on at $5.02 \times 10^{-7}$ seconds. At $5.03 \times 10^{-7}$ seconds, the current flowing through the point D is 0 A, the current flowing through the point E is −8 A, and the current flowing through the point F is 8 A. At this time, the output capacitance 14 of the HEMT 11 is charged by the magnetic energy accumulated in the inductor 13.

Figure 14:
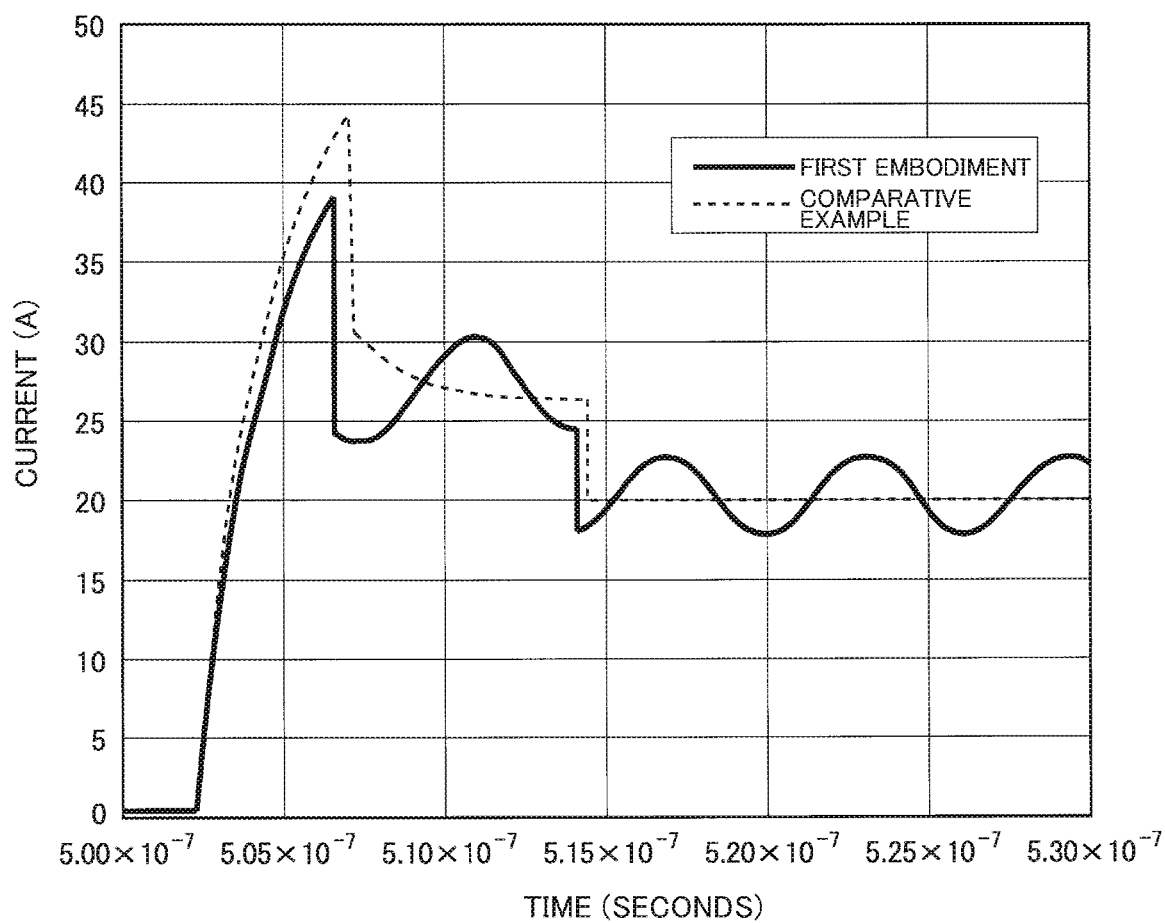
FIG. 14 is a waveform diagram of currents flowing through a point G illustrated in FIG. 9.
Figure 15:
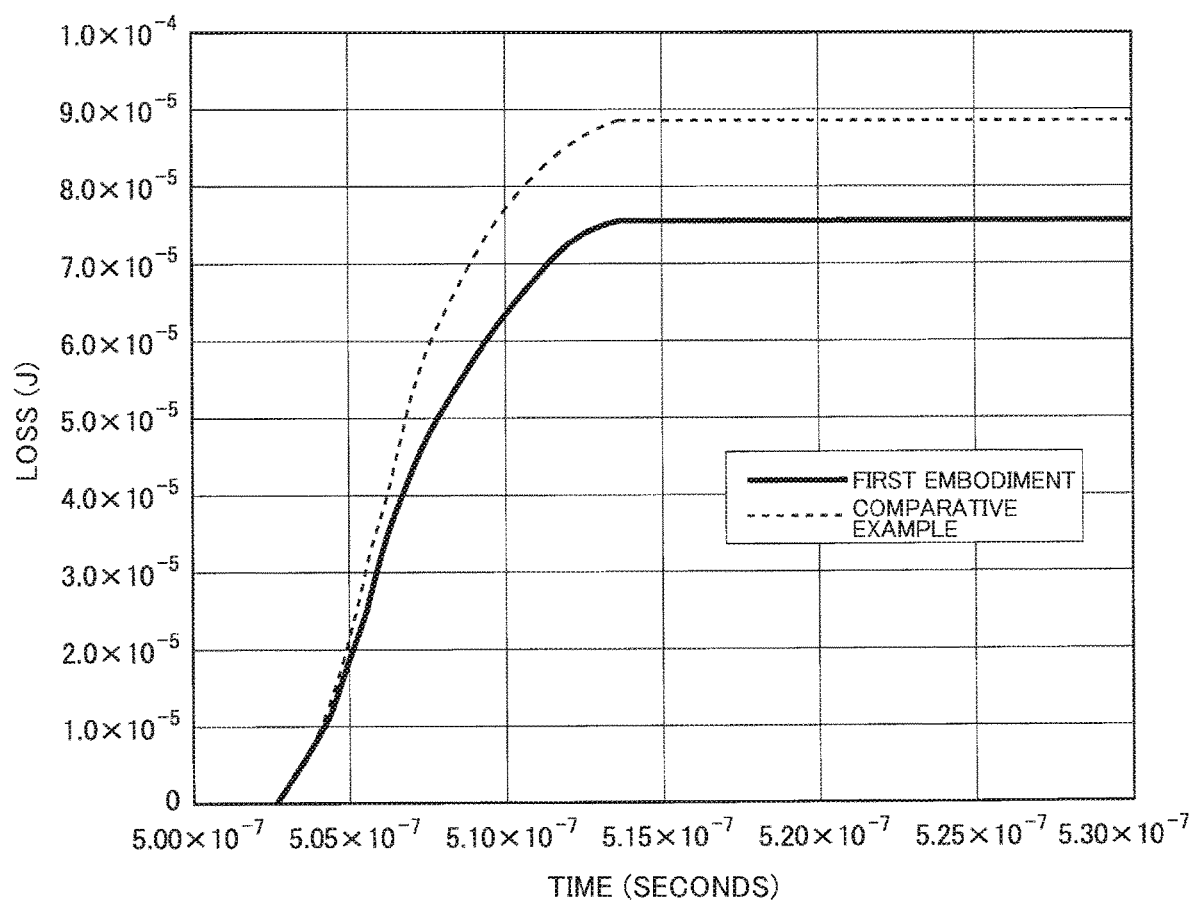
FIG. 15 is a diagram illustrating integrated values of switching loss in the power supply device illustrated in FIG. 9.

FIG. 14 is a waveform diagram of a current flowing through the point G. FIG. 15 is a diagram illustrating integrated values of switching loss in the output capacitance 14. In FIGS. 14 and 15, a solid line indicates characteristics of the step-up chopper circuit 40, and a broken line indicates characteristics of a step-up chopper circuit provided with the rectifying circuit according to the comparative example (hereinafter referred to as a step-up chopper circuit according to the comparative example).

As indicated by the broken line in FIG. 14, in the step-up chopper circuit according to the comparative example, a current flowing through the point G has a maximum value of approximately 45 A near $5.07 \times 10^{-7}$ seconds. In contrast, as indicated by the solid line in FIG. 14, in the step-up chopper circuit 40, a current flowing through the point G has a maximum value of approximately 39 A near $5.07 \times 10^{-7}$ seconds. The latter is smaller than the former. Therefore, according to the step-up chopper circuit 40, loss can be reduced in comparison with the step-up chopper circuit according to the comparative example to the degree proportional to an amount of current by which the current in the step-up chopper circuit 40 is smaller than the current in the comparative example. In addition, since the current is small, the gate voltage can be kept stable.

The loss at the maximum current is mainly generated when the HEMT 42 changes from the OFF state to the ON state. The reason for this is that the on-resistance is not sufficiently lowered during the course of changing to the ON state. As indicated by the broken line in FIG. 15, in the step-up chopper circuit according to the comparative example, the loss during the switching period is $8.9 \times 10^{-5}$ J. In contrast, as indicated by the solid line in FIG. 15, in the step-up chopper circuit 40, the loss during the switching period is $7.5 \times 10^{-5}$ J. According to the step-up chopper circuit 40 as discussed above, loss can be reduced.

The HEMT has a problem that the gate voltage becomes unstable because of its small input capacitance. In a GaN-HEMT, a charge of 110 nC flows when a voltage of 400 V is applied to the output capacitance. This charge has influence on the surrounding magnetic field and electric field since it flows through not only the HEMT but also through all the conductive pathways from the voltage supply point of 400 V. In particular, the input capacitance of the GaN-HEMT is small. For example, when the charge accumulated in the output capacitance of the GaN-HEMT is 110 nC, the input capacitance of the GaN-HEMT may be 400 pF. In such a case, the gate voltage of the GaN-HEMT is susceptible to the surrounding magnetic field and electric field.

In the step-up chopper circuit 40, it is possible to suppress the amount of charge flowing per unit time. Accordingly, when the output capacitance 14 of the HEMT 11 is charged, it is possible to prevent the gate voltage of the HEMT 11 from becoming unstable under the influence of the surrounding magnetic field and electric field. The charge that charges the output capacitance 14 of the HEMT 11 passes through not only the HEMT 11 but also through the HEMT 42. Accordingly, when the output capacitance 14 of the HEMT 11 is charged, it is also possible to prevent the gate voltage of the HEMT 42 from becoming unstable under the influence of the surrounding magnetic field and electric field.

In the step-up chopper circuit 40, a voltage of 6 V is applied to the gate terminal based on the source terminal when the HEMT (specifically, the HEMT 11 or 42) is to be turned on, and a voltage of 0 V is applied to the gate terminal based on the source terminal when the HEMT is to be turned off. The reason for this is that, since the input capacitance of the HEMT is small and the gate voltage of the HEMT is likely to fluctuate, it is difficult to control the gate voltage of the HEMT by voltages of three or more steps.

As a method for stably maintaining the HEMT gate voltage at 6 V, a capacitor having a capacitance of five times or more (more preferably 10 times or more) the input capacitance of the HEMT may be connected in parallel to the input capacitance of the HEMT while the HEMT is turned on. It is preferable for the capacitance of the capacitor connected in parallel to be large. However, it is difficult to dispose a capacitor having a capacitance of one million times or more the input capacitance of the HEMT because the size of the capacitor is large.

As described above, the rectifying circuit 19 according to the present reference example includes the HEMT 11 and the diode 12 connected in antiparallel to the HEMT 11. In the rectifying circuit 19, the forward voltage drop when the diode 12 starts to be conductive is smaller than the voltage drop when the HEMT 11 is reverse-conductive in the OFF state corresponding to an amount of rectified current when the HEMT 11 is reverse-conductive in the ON state. The inductance of a pathway extending through the diode 12 is larger than the inductance of a pathway extending through the HEMT 11 among the pathways connecting the source terminal and the drain terminal of the HEMT 11. The amount of charge accumulated in the parasitic capacitance 15 of the diode 12 is smaller than the amount of charge accumulated in the output capacitance 14 of the HEMT 11.

Accordingly, in the rectifying circuit 19, in the case where the HEMT 11 is reverse-conductive in the ON state and the rectified current is flowing, when the HEMT 11 is turned off, part of the rectified current flows passing through the diode 12, and magnetic energy is accumulated in the inductor 13 on the pathway extending through the diode 12 (a difference in inductance between the two pathways). When the flow of the rectified current is stopped, a low voltage is generated by the accumulated magnetic energy and the output capacitance 14 of the HEMT 11 is charged by the low voltage. Thus, switching loss due to the charge accumulated in the output capacitance 14 of the HEMT 11 may be reduced. In addition, by making the amount of charge accumulated in the parasitic capacitance 15 of the diode 12 smaller than the amount of charge accumulated in the output capacitance 14 of the HEMT 11, it is possible to reduce the switching loss due to the charge accumulated in the parasitic capacitance 15 of the diode 12. Furthermore, it is also possible to prevent the gate voltage of the HEMT from becoming unstable under the influence of the surrounding magnetic field and electric field.

The forward voltage drop of the diode 12 corresponding to 10% of the amount of rectified current when the HEMT 11 is reverse-conductive in the ON state is smaller, by equal to or greater than 0.2 V, than the voltage drop when the HEMT 11 is reverse-conductive in the OFF state corresponding to the amount of rectified current when the HEMT 11 is reverse-conductive in the ON state. By setting the difference in voltage drop to be equal to or greater than 0.2 V, it is possible to reliably flow a current on the pathway extending through the diode 12 when the HEMT 11 is turned off.

The threshold voltage of the HEMT 11 is in a range from 0.5 V to 5 V. This makes it possible to cause the forward voltage drop when the diode 12 starts to be conductive to be smaller than the voltage drop of the HEMT 11 during the reverse-conduction thereof, and makes it easy to flow a current on the pathway extending through the diode 12 when the HEMT 11 is turned off.

The HEMT 11 is turned on after the rectified current starts to flow, and is turned off before the flow of the rectified current is stopped. Part of the current that flows passing through the HEMT 11 when the HEMT 11 is reverse-conductive in the ON state flows passing through the diode 12 after the HEMT 11 is turned off. When the rectified current flows, the voltage of the output capacitance 14 of the HEMT 11 and the voltage of the parasitic capacitance 15 of the diode 12 are lowered. Thereafter, the HEMT 11 is turned on to make it possible to reduce the loss. The current flows passing through the diode 12 and the inductor 13 after the HEMT 11 is turned off, so that the magnetic energy is accumulated in the inductor 13. When the flow of the rectified current is stopped, the output capacitance 14 of the HEMT 11 is charged by the low voltage generated in the inductor 13. Thus, switching loss due to the charge accumulated in the output capacitance 14 of the HEMT 11 may be reduced.

When the drain voltage of the HEMT 11 falls within a range from 0% to 10% of the rated voltage, the average of the output capacitance of the HEMT 11 is twice or more the output capacitance of the HEMT 11 when the drain voltage of the HEMT 11 takes the rated voltage. Accordingly, it is possible, when the voltage of the output capacitance 14 of the HEMT 11 is low, to charge the output capacitance 14 by the low voltage generated in the inductor 13 and effectively reduce the switching loss.

Note that the HEMT 11 includes a conductive layer under the two-dimensional electron gas layer 37. Accordingly, it is possible to reduce the switching loss in the rectifying circuit 19 using the HEMT 11 including a conductive layer under the two-dimensional electron gas layer 37. Further, the rectifying circuit 19 controls the gate voltage of the HEMT 11 to be at the same level as the source voltage when the HEMT 11 is turned off. Thus, the HEMT 11 can be turned off by a simple circuit.

The power supply circuit (step-up chopper circuit 40) according to the present reference example includes the rectifying circuit 19. According to the power supply circuit according to the present reference example, it is possible to reduce switching loss of the power supply circuit by using the rectifying circuit 19 in which switching loss is reduced.

Second Reference Example

Figure 16:
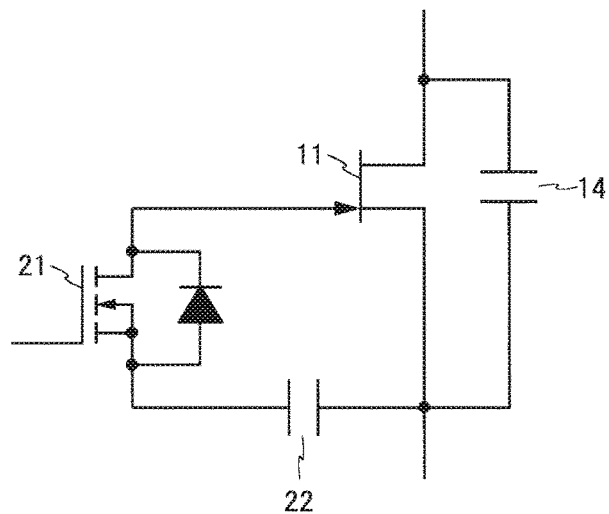
FIG. 16 is a diagram illustrating a method for controlling a gate voltage of a HEMT in a rectifying circuit according to a second reference example.

In a second reference example, a rectifying circuit in which switching loss is further reduced will be described. FIG. 16 is a diagram illustrating a method for controlling a gate voltage of the HEMT 11 in the rectifying circuit according to the present reference example. As illustrated in FIG. 16, in the rectifying circuit according to the present reference example, the transistor 21 and a capacitor 22 are provided between the gate terminal and the source terminal of the HEMT 11. The drain terminal of the transistor 21 is connected to the HEMT 11 gate terminal. The source terminal of the transistor 21 is connected to a first electrode (an electrode on the left side in FIG. 16) of the capacitor 22. A second electrode of the capacitor 22 is connected to the HEMT 11 source terminal. The capacitor 22 accumulates a prescribed amount of charge, and a voltage of the first electrode of the capacitor 22 is lower than a voltage of the second electrode thereof by a prescribed amount. A resistor or a diode may be provided on a pathway connecting the HEMT 11 and the transistor 21.

Hereinafter, it is considered that the HEMT 11 is a GaN-HEMT having a threshold voltage of 2 V, and a voltage between the electrodes of the capacitor 22 is 3 V. In this case, when the transistor 21 is turned on, the gate voltage of the HEMT 11 is lower than the source voltage by 3 V. In this manner, the rectifying circuit according to the present reference example controls the gate voltage of the HEMT 11 to be lower than the source voltage when the HEMT 11 is turned off.

The double-dot dash line illustrated in FIG. 4 is a graph showing the characteristics of the GaN-HEMT having a threshold voltage of 2 V when the voltage between the gate and the source is −3 V. The characteristics mentioned above are the same as the characteristics of the GaN-HEMT having a threshold voltage of 5 V when the voltage between the gate and the source is 0 V. In the rectifying circuit according to the present reference example, the voltage drop of the GaN-HEMT during reverse-conduction is higher than that in the first reference example by 3 V.

As the voltage drop of the HEMT 11 during reverse-conduction increases, the current flowing through the HEMT 11 decreases and the current flowing through the diode 12 and the inductor 13 increases. Accordingly, by using a larger amount of current flowing through the inductor 13 to charge the output capacitance 14 of the HEMT 11, it is possible to reduce the switching loss.

As described above, the rectifying circuit according to the present reference example controls the gate voltage of the HEMT 11 to be lower than the source voltage when the HEMT 11 is turned off. This makes it possible to increase the voltage drop of the HEMT 11 when the HEMT 11 is reverse-conductive. Therefore, with the rectifying circuit according to the present reference example, by flowing a larger amount of current on the pathway extending through the diode 12 and the inductor 13, the switching loss can be further reduced. Alternatively, it is also possible to constitute a rectifying circuit in which switching loss is reduced by using a HEMT having a threshold voltage of equal to or smaller than 0 V.

Due to manufacturing and structural constraints, it is difficult to set the threshold voltage of the HEMT to an arbitrary value. In the current technology, the upper limit of the threshold voltage is about 2 V. Thus, as in the present reference example, by applying a negative voltage to the gate terminal of the HEMT, the stated HEMT can be used in the same manner as a HEMT having a high threshold voltage (see FIG. 4). As a result, it is possible to widen a range in which the current flowing through the diode can be controlled.

First Embodiment

In a first embodiment, a rectifying circuit in which switching loss is further reduced by a method different from that in the second reference example will be described. Hereinafter, a difference between the gate voltage and the source voltage of the HEMT included in the rectifying circuit is referred to as a gate drive voltage Vgs.

In the first reference example, a case where the rectifying circuit 19 included in the step-up chopper circuit 40 illustrated in FIG. 9 performs synchronous rectification was described with reference to FIG. 13. A rectified current flows intermittently in the rectifying circuit 19. The rectified current starts to be conductive when the HEMT 42 enters an OFF state and the conduction is stopped when the HEMT 42 enters an ON state. In other periods, by performing synchronous rectification in this manner, it is possible to reduce conduction loss.

When the rectifying circuit 19 performs synchronous rectification, two dead time periods are set. Hereinafter, the period from when rectified current starts to flow to when the HEMT 11 is turned on is referred to as a first dead time period, and the period from when the HEMT 11 is turned off to when the rectified current is stopped is referred to as a second dead time period. The first dead time period is provided to account for variations in gate drive timing. The length of the first dead time period is sufficiently shorter than the switching period of the rectifying circuit 19, and is, for example, equal to or longer than 1 nanosecond and equal to or shorter than 1 microsecond. The second dead time period is provided to allow a current to flow through the diode 12 and magnetic energy to be accumulated in the inductor 13 when the HEMT 11 is turned off. The second dead time period is also provided to account for variations in gate drive timing.

As described in the second reference example, the gate voltage of the HEMT 11 is controlled to be lower than the source voltage in the second dead time period (the gate drive voltage Vgs is set to a negative voltage), making it possible to further reduce the switching loss in the rectifying circuit 19. On the other hand, in the first dead time period, it is not necessary to accumulate magnetic energy in the inductor 13. When the gate drive voltage Vgs is made to be a negative voltage in the first dead time period, reverse conduction loss increases. In FIG. 4, the graph of the double-dot dash line shows the characteristics when Vgs=−3 V and the graph of the broken line shows characteristics when Vgs=0 V. As shown in FIG. 4, in a case where the current amount is the same, there is greater voltage drop as well as greater reverse conduction loss when Vgs=−3 V than when Vgs=0 V. Therefore, there is no advantage to be gained by making the gate drive voltage Vgs a negative voltage in the first dead time period.

Thus, the preferred gate drive voltage Vgs is different between the first dead time period and the second dead time period. In the first dead time period, in order to reduce the reverse conduction loss, the gate drive voltage Vgs is preferably the highest voltage possible among the voltages at which the HEMT 11 is turned off. In the second dead time period, the gate drive voltage Vgs is preferably a negative voltage to allow a current to flow to the inductor 13. The gate drive voltage Vgs is preferably 0 V in the first dead time period and preferably −3 V in the second dead time period, for example. In the present embodiment, a rectifying circuit provided with a gate drive circuit configured to control the gate drive voltage Vgs in this way will be described.

Figure 17:
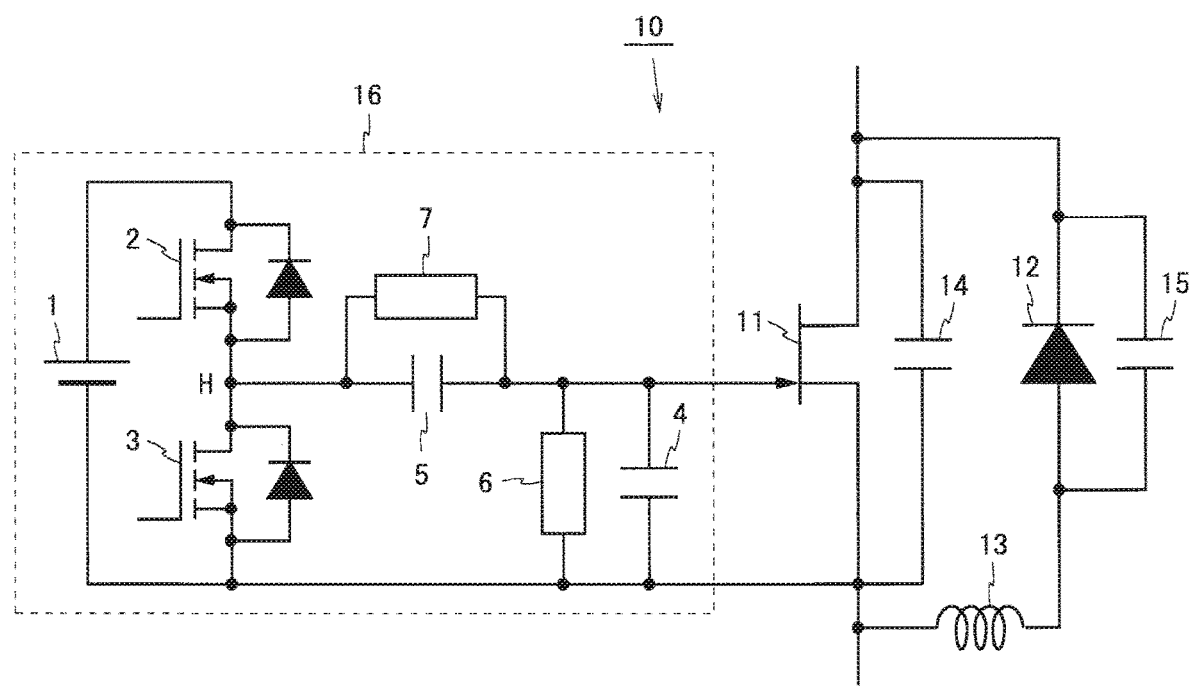
FIG. 17 is a circuit diagram of a rectifying circuit according to a first embodiment.

FIG. 17 is a circuit diagram of a rectifying circuit according to the present embodiment. A rectifying circuit 10 illustrated in FIG. 17 is obtained by adding a gate drive circuit 16 to the rectifying circuit 19 (FIG. 1) according to the first reference example. The rectifying circuit 10 includes the HEMT 11, the diode 12, and the gate drive circuit 16. The gate drive circuit 16 includes a gate drive power supply 1, transistors 2 and 3, capacitors 4 and 5, and resistors 6 and 7. The gate drive circuit 16 is connected to the gate and source terminals of the HEMT 11 and controls the gate drive voltage Vgs. A circuit obtained by removing the gate drive circuit 16 from the rectifying circuit 10 has the same characteristics as the rectifying circuit 19 and operates in the same way as the rectifying circuit 19.

The gate drive power supply 1 is a voltage supply source that outputs a prescribed voltage (hereinafter referred to as a power supply voltage Va). A positive electrode of the gate drive power supply 1 is connected to a drain terminal of the transistor 2. A negative electrode of the gate drive power supply 1 is connected to a source terminal of the transistor 3 and the source terminal of the HEMT 11. A source terminal of the transistor 2 is connected to a drain terminal of the transistor 3. Hereinafter, a node where the source terminal of the transistor 2 and the drain terminal of the transistor 3 are connected is referred to as a node H.

The capacitor 4 includes an input capacitance (Ciss) of the HEMT 11 and is provided between the gate and source terminals of the HEMT 11. In a case where the input capacitance has a suitable capacitance value, the input capacitance is used as the capacitor 4 as is. In a case where the capacitance value of the capacitor 4 needs to be adjusted, a capacitor obtained by connecting other capacitors in parallel to the input capacitance is used as the capacitor 4. Note that, in FIG. 17, a capacitance (Crss) between the gate and the drain included in the input capacitance is omitted.

The resistor 6 is connected in parallel to the capacitor 4. The resistor 6 includes a parasitic resistance between the gate and the source terminals of the HEMT 11, and is provided between the gate and source terminals of the HEMT 11. In a case where the parasitic resistance has a suitable resistance value, the parasitic resistance is used as the resistor 6 as is. In a case where the resistance value of the resistor 6 needs to be adjusted, a resistor obtained by connecting other resistors in parallel to the parasitic resistance is used as the resistor 6. For example, in a case where the resistance value of the parasitic resistance between the gate and the source of the GaN-HEMT is 20 kΩ, the resistance value of the resistor 6 may be adjusted to 500Ω by connecting a resistor of 513Ω in parallel to the parasitic resistance.

The capacitor 5 is provided between the node H and the gate terminal of the HEMT 11. The resistor 7 is connected in parallel to the capacitor 5. In the gate drive circuit 16, the pathway from the positive electrode of the gate drive power supply 1 to the negative electrode of the gate drive power supply 1 passing through the transistor 2, the node H, the capacitor 5 or the resistor 7, and the capacitor 4 or the resistor 6 is a charging pathway for charging the gate terminal of the HEMT 11. The capacitor 5 is provided on this charging pathway. While the capacitor 5 in FIG. 7 is provided between the node H and the gate terminal of the HEMT 11, the capacitor 5 may be provided between the source terminal of the HEMT 11 and the source terminal of the transistor 3.

The transistors 2 and 3 control the voltage at the node H in two stages by being turned on in a complementary manner. When the transistor 2 is in an OFF state and the transistor 3 is in an ON state, the voltage at the node H is equal to the source voltage of the HEMT 11. At this time, the voltage at the node H becomes 0 V based on the source voltage of the HEMT 11. When the transistor 2 is in an ON state and the transistor 3 is in an OFF state, the voltage at the node H is equal to the power supply voltage Va. At this time, the voltage at the node H becomes Va based on the source voltage of the HEMT 11.

Hereinafter, a capacitance value of the capacitor 4 is C1, a capacitance value of the capacitor 5 is C2, a resistance value of the resistor 6 is R1, and a resistance value of the resistor 7 is R2. Additionally, Va=15 V, C1=2 nF, C2=3 nF, R1=500Ω, R2=750Ω, an operating frequency of the gate drive circuit 16 is 66 kHz, and a period in which the rectified current flows through the rectifying circuit 10 is a half cycle.

In a typical rectifying circuit 10, the input capacitance values of the capacitors 4 and 5 and the HEMT 11 and the series parasitic resistance values of the transistors 2 and 3 are sufficiently small compared to the resistance values of the resistors 6 and 7, and are, for example, equal to or less than 10Ω. As a result, problems may arise due to the charging rate being too fast. To solve this problem, another resistor may be placed on the pathway connecting the node H and the HEMT 11. However, the resistance value of the placed resistor needs to be sufficiently smaller than the resistance values of the resistors 6 and 7.

Figure 18:
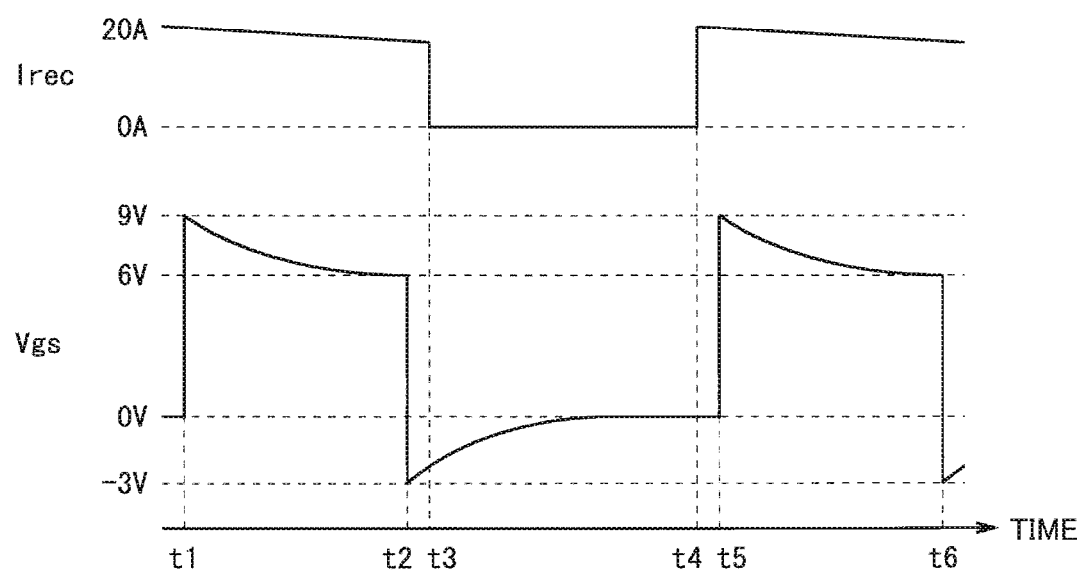
FIG. 18 is a waveform diagram of the rectifying circuit illustrated in FIG. 17.

FIG. 18 is a waveform diagram of the rectifying circuit 10. FIG. 18 describes changes in a rectified current Irec flowing through the rectifying circuit 10 and the gate drive voltage Vgs. The change in the rectified current Irec described in FIG. 18 is an enlargement of a dashed line portion X2 in FIG. 10.

Times t1 and t5 are timings at which the HEMT 11 is turned on. Times t2 and t6 are timings at which the HEMT 11 is turned off. Time t3 is a timing at which the flow of the rectified current stopped. Time t4 is a timing at which the rectified current starts to flow. Hereinafter, a period from the time t1 to the time t2 is referred to as a gate-on period, and a period from the time t2 to the time t5 is referred to as a gate-off period. The length of the period from the time t1 to the time t5 is 15.15 microseconds (=1/66 kHz). The length of the period from the time t3 to the time t4 is half of the above period (7.58 microseconds). The period from the time t4 to the time t5 is the first dead time period. The period from the time t2 to the time t3 is the second dead time period. The lengths of the first and second dead time periods are considered to be 50 nanoseconds. Note that, in FIG. 18, the first and second dead time periods are illustrated in an exaggerated manner.

The rectified current Irec is stopped at the time t3 and starts to flow at the time t4. The gate drive voltage Vgs instantaneously rises from 0 V to 9 V at the time t1, curvilinearly falls from 9 V to 6 V in the gate-on period, instantaneously falls from 6 V to −3 V at the time t2, and curvilinearly rises from −3 V to 0 V in the gate-off period. Hereinafter, changes in the gate drive voltage Vgs will be described.

At the time t1, the transistor 2 is turned on and the transistor 3 is turned off. After the time t1, the voltage at the node H is equal to the power supply voltage Va. The gate drive voltage Vgs immediately after the time t1 is a voltage at which the power supply voltage Va is divided by the reciprocals of the capacitance values C1 and C2 of the capacitors 4 and 5, that is, a voltage VgsA given by Equation (1) below.

$$VgsA = Va \times C2/(C1+C2) \quad (1)$$

When Va=15 V, C1=2 nF, and C2=3 nF, VgsA=9 V.

When the voltage applied to the capacitors 4 and 5 at the time t1 is switched from 0 V to Va, a current for charging the capacitors 4 and 5 flows. At this time, the current flows instantaneously without passing through the resistors 6 and 7. Accordingly, the capacitors 4 and 5 are instantaneously charged immediately after the time t1, and the gate drive voltage Vgs instantaneously rises from 0 V to 9 V at the time t1.

In the gate-on period, the transistor 2 is in the ON state and the transistor 3 is in the OFF state, and thus the voltage at the node H is kept at Va. In the gate-on period, the current flows passing through the resistors 6 and 7. The capacitors 4 and 5 are charged or discharged by the current flowing at this time, and the gate drive voltage Vgs changes accordingly. In the rectifying circuit 10, the capacitance values C1 and C2 of the capacitors 4 and 5, and the resistance values R1 and R2 of the resistors 6 and 7 are determined so that the gate drive voltage Vgs is lowered during the gate-on period. Accordingly, the capacitor 4 is discharged in the gate-on period and the capacitor 5 is charged in the gate-on period.

During the gate-on period, the gate drive voltage Vgs approaches a voltage at which the power supply voltage Va is divided by the resistance values of the resistors 6 and 7, that is, a voltage VgsB given by Equation (2) below.

$$VgsB = Va \times R1/(R1+R2) \quad (2)$$

When Va=15 V, R1=500Ω, and R2=750Ω, VgsB=6 V.

The discharging rate of the capacitor 4 and the charging rate of the capacitor 5 gradually slow, and thus it takes a long time until the gate drive voltage Vgs reaches the voltage VgsB. Therefore, strictly speaking, the gate drive voltage Vgs immediately before the time t2 is slightly higher than the voltage VgsB. For example, the gate drive voltage Vgs immediately before the time t2 is 6.02 V instead of 6 V. However, since the difference between the two is sufficiently small, there is no problem even when the gate drive voltage Vgs immediately before the time t2 is regarded as the voltage VgsB.

At the time t2, the transistor 2 is turned off and the transistor 3 is turned on. After the time t2, the voltage at the node 11 is 0 V. The gate drive voltage Vgs immediately after the time t2 is considered to be VgsC. When the voltage at the node H changes, charge is transferred between the capacitors 4 and 5 and the amount of charge accumulated in each of the capacitors 4 and 5 changes. However, even when the voltage at the node H changes, the sum of the amounts of charge accumulated in the capacitors 4 and 5 does not change. Therefore, Equation (3) below holds. From Equation (3), Equation (4) is derived.

$$C1 \times VgsB - C2 \times (Va - VgsB) = C1 \times VgsC + C2 \times VgsC \quad (3)$$

$$VgsC = Va \times (R1 \times C1 - R2 \times C2)/\{(R1+R2)(C1+C2)\} \quad (4)$$

When Va=15 V, C1=2 nF, C2=3 nF, R1=500Ω, R2=750Ω, VgsC=−3 V.

When the voltage applied to the capacitors 4 and 5 at the time t2 is switched from Va to 0 V, a current for discharging the capacitors 4 and 5 flows. At this time, the current flows instantaneously without passing through the resistors 6 and 7. Accordingly, the capacitors 4 and 5 are instantaneously discharged immediately after the time t2, and the gate drive voltage Vgs instantaneously drops from about 6 V to −3 V at the time t2.

From Equations (1), (2) and (4), Equation (5) below holds between the voltages VgsA, VgsB and VgsC.

$$VgsA - VgsB = -VgsC \quad (5)$$

Accordingly, the gate drive voltage VgsC immediately after the time t2 can be said to be lower than 0 V by the amount of decrease in the gate drive voltage Vgs in the gate-on period (the difference between the voltage VsgA and the voltage VgsB).

In the gate-off period, the transistor 2 is in the OFF state and the transistor 3 is in the ON state, and thus the voltage at the node H is kept at 0 V. In the gate-off period, the current flows passing through the resistors 6 and 7. The capacitors 4 and 5 are discharged by the current flowing at this time, and the gate drive voltage Vgs changes accordingly. In the gate-off period, the gate drive voltage Vgs approaches a voltage at which 0 V is divided by the resistance values of the resistors 6 and 7, that is, 0 V.

The discharging rates of the capacitors 4 and 5 gradually slow, and thus it takes a long time until the gate drive voltage Vgs reaches 0 V. Therefore, strictly speaking, the gate drive voltage Vgs immediately before the time t5 is slightly lower than 0 V. For example, the gate drive voltage Vgs immediately before the time t5 is −0.02 V instead of 0 V. However, since the difference between the two is sufficiently small, there is no problem even when the gate drive voltage Vgs immediately before the time t5 is regarded as 0 V.

The gate drive voltage VgsA immediately after the time t1 is determined by the power supply voltage Va and the capacitance values C1 and C2 (Equation (1)). The gate drive voltage VgsB immediately before the time t2 is determined by the power supply voltage Va and the resistance values R1 and R2 (Equation (2)). The gate drive voltage VgsC immediately after the time t2 is determined by the power supply voltage Va, the capacitance values C1 and C2, and the resistance values R1 and R2 (Equation (4)). The gate drive voltage VgsC immediately after the time t2 is lower than 0 V by the amount of decrease of the gate drive voltage Vgs in the gate-on period (Equation (5)). Thus, in a case where the capacitance values C1 and C2 and the resistance values R1 and R2 are suitably determined, the gate drive voltage VgsC immediately after the time t2 is sufficiently lower than 0 V.

In this case, in the second dead time period, the gate drive voltage Vgs is a negative voltage. Accordingly, in the second dead time period, the reverse-direction current flowing through the HEMT 11 can be easily diverted to the diode 12 to reduce the switching loss. However, when the gate drive voltage VgsB immediately after the time t2 is about −0.1 V, the effect of loss reduction cannot be sufficiently achieved due to the influence of error. To achieve the effect of loss reduction, the gate drive voltage Vgs immediately after the time t2 (immediately after the HEMT 11 is turned off) is preferably lower than −0.2 V, and more preferably lower than −1 V.

When k is a magnification of the voltage VgsA relative to the voltage VgsB, the magnification k is given by Equation (6) below.

$$k=(R1+R2)\times C2/\{R1\times(C1+C2)\} \quad (6)$$

When C1=2 nF, C2=3 nF, R1=500Ω, and R2=750Ω, k=1.5.

In the rectifying circuit 10, the capacitance values C1 and C2 and the resistance values R1 and R2 are determined so that the magnification k exceeds 1, that is, Equation (7) below holds.

$$C2/(C1+C2)>R1/(R1+R2) \quad (7)$$

Thus, the gate drive voltage VgsA immediately after the time t1 is higher than the gate drive voltage VgsB immediately before the time t2, and the gate drive voltage VgsC immediately after the time t2 is a negative voltage. In particular, the capacitance values C1 and C2 and the resistance values R1 and R2 are preferably determined so that the magnification k exceeds 1.1, that is, Equation (8) below holds.

$$C2/(C1+C2)>1.1\times R1/(R1+R2) \quad (8)$$

When the magnification k is less than 1.1, the effect of loss reduction cannot be sufficiently achieved due to the influence of the parasitic components of the circuit. In order to sufficiently achieve the effect of loss reduction, it is preferable for the magnification k to be equal to or greater than 1.1, and more preferable to be equal to or greater than 1.3 and equal to or less than 1.8. Note that, based on the limit of the voltage resistance of the circuit, the upper limit of the magnification k is approximately 10.

In the first dead time period, some of the current flowing in the rectifying circuit 10 flows through the HEAT 11. Since the gate drive voltage Vgs in the first dead time period is substantially 0 V, the reverse conduction loss can be reduced. When the gate drive voltage Vgs in the first dead time period is less than −0.2 V, the effect of reducing the reverse conduction loss cannot be sufficiently achieved. In order to sufficiently achieve the effect of reducing the reverse conduction loss, the gate drive voltage Vgs in the first dead time period is preferably higher than −0.2 V, and more preferably higher than −0.1 V.

In the rectifying circuit 10, the inductor 13 is connected in series to the diode 12. In the first dead time period, when the rectified current Irec starts to flow through the rectifying circuit 10, the action of the inductor 13 delays the increase in current flowing through the diode 12. Thus, when the rectified current starts to flow, the rectified current is likely to flow to the HEMT 11 side. The rectified current flowing through the HEMT 11 causes a conduction loss due to a voltage drop corresponding to the gate drive voltage Vgs (see FIG. 4). In the rectifying circuit 10 provided with the HEMT 11, the diode 12, and the inductor 13, by causing the gate drive voltage Vgs to rise to 0 V, it is possible to reduce conduction loss due to the rectified current of the first dead time period.

The length of the gate-on period varies in accordance with a duty ratio of a control signal supplied to the rectifying circuit 10. Thus, in a case where the gate drive voltage Vgs is equal to or greater than −0.2 V shortly before the first dead time period, it may not be possible to account for the change in the duty ratio. Thus, the gate drive voltage Vgs is preferably higher than −0.2 V at a timing sufficiently earlier than the first dead time period.

The gate drive voltage Vgs is preferably higher than −0.2 V after the increased current flowing through the diode 12 no longer flows due to the HEMT 11 being turned off in the second dead time period. Since current does not flow through the rectifying circuit 10 after the current no longer flows through the diode 12, it is not necessary to divert the current to the diode 12. The timing at which the gate drive voltage Vgs becomes higher than −0.2 V may be 1 nanosecond or longer after the current no longer flows through the diode 12. However, in order to have a time margin, the timing at which the gate drive voltage Vgs becomes higher than −0.2 V is preferably at least 50 nanoseconds after the current no longer flows through the diode 12.

Generally speaking, when the gate drive voltage Vgs is changed to have a rectangular shape, noise is more likely to occur. In addition, when the gate drive voltage Vgs is changed in three or more stages, malfunction due to noise is likely to occur. As illustrated in FIG. 18, in the rectifying circuit 10, the gate drive voltage Vgs is switched to a relatively high level in the gate-on period and to a relatively low level in the gate-off period in two stages, and changes in a curvilinear manner in the gate-on period and the gate-off period. Accordingly, with the rectifying circuit 10, noise and malfunction due to the noise can be prevented.

The effect of providing the capacitor 5 in the rectifying circuit 10 will be described below. In a circuit in which the capacitor 5 is removed from the rectifying circuit 10, the rate of rise of the gate drive voltage Vgs is slowed by the action of the resistor 7. Thus, it takes time for the gate drive voltage Vgs to rise to the voltage VgsB, which increases switching loss. The rate of decrease of the gate drive voltage Vgs is slowed by the action of the resistor 7. Thus, it takes time for the gate drive voltage Vgs to fall from the on voltage to the threshold voltage (for example, 2 V), which increases switching loss.

In contrast, in the rectifying circuit 10, the gate drive voltage Vgs instantaneously rises to the voltage VgsA, which is higher than the voltage VgsB, immediately after the time t1. Accordingly, a channel resistance of the HEMT 11 is immediately lowered, making it possible to reduce switching loss. Further, the gate drive voltage Vgs is lowered to the voltage VgsB in the gate-on period. Accordingly, at the time t2, the HEMT 11 can be easily turned off by lowering the gate drive voltage Vgs from the voltage VgsB to the threshold voltage or less, rather than from the voltage VgsA to the threshold voltage or less.

The gate drive voltage Vgs instantaneously falls to the voltage VgsC, which is lower than the threshold voltage, immediately after the time t2. Accordingly, the off operation of the HEMT 11 is sped up, making it possible to reduce switching loss. The gate drive voltage Vgs rises to 0 V in the gate-off period. Accordingly, at the time t5, the HEMT 11 can be easily turned on by causing the gate drive voltage Vgs to rise from 0 V to the threshold voltage or greater, rather than from the voltage VgsC to the threshold voltage or greater.

As described above, the rectifying circuit 10 according to the present embodiment includes the HEMT 11, the diode 12 connected in antiparallel to the HEMT 11, and the gate drive circuit 16. The gate drive circuit 16 includes the gate drive power supply 1, a first transistor (transistor 2) including a first conduction terminal (drain terminal) connected to a positive electrode of the gate drive power supply 1 and a second conduction terminal (source terminal) connected to a first node (node H), a second transistor (transistor 3) including a first conduction terminal connected to the first node and a second conduction terminal connected to a negative electrode of the gate drive power supply 1 and the source terminal of the HEMT 11, and configured to turn on in a complementary manner with the first transistor, a first capacitor (capacitor 4) including an input capacitance of the HEMT 11, and provided between the gate terminal and the source terminal of the HEMT 11, a second capacitor (capacitor 5) provided on the pathway extending through the first node and configured to charge the input capacitance, a first resistor (resistor 6) connected in parallel to the first capacitor, and a second resistor (resistor 7) connected in parallel to the second capacitor. In the rectifying circuit 19, the forward voltage drop when the diode 12 starts to be conductive is smaller than the voltage drop when the HEMT 11 is reverse-conductive in the OFF state corresponding to an amount of rectified current when the HEMT 11 is reverse-conductive in the ON state. The inductance of a pathway extending through the diode 12 is larger than the inductance of a pathway extending through the HEMT 11 among the pathways connecting the source terminal and the drain terminal of the HEMT 11. The amount of charge accumulated in the parasitic capacitance of the diode 12 is smaller than the amount of charge accumulated in the output capacitance 14 of the HEMT 11. The gate drive circuit 16 controls the gate voltage of the HEMT 11 to make be lower than the source voltage when the HEMT 11 is turned off.

According to the rectifying circuit 10 described above, the gate drive circuit 16 can be used to control the gate drive voltage Vgs (the difference between the gate voltage and the source voltage of the HEMT 11) so as to instantaneously change from 0 V to the voltage VgsA when the HEMT 11 is turned on, curvilinearly change from the voltage VgsA to the voltage VgsB in a period in which the HEMT 11 is in an ON state, instantaneously change from the voltage VgsB to the voltage VgsC when the HEMT 11 is turned off, and change from the voltage VgsC to 0 V in a period in which the HEMT 11 is in an OFF state. The voltage VgsA is determined by the power supply voltage Va and the capacitance values of the two capacitors, the voltage VgsB is determined by the power supply voltage Va and the resistance values of the two resistors, and the voltage VgsC is determined by the power supply voltage Va, the capacitance values of the two capacitors, and the resistance values of the two resistors. Accordingly, by suitably determining the power supply voltage Va, the capacitance values, and the resistance values, it is possible to control the gate drive voltage Vgs to a desired level immediately after the HEMT 11 is turned on, immediately before the HEMT 11 is turned off, and immediately after the HEMT 11 is turned off and reduce switching loss.

In the rectifying circuit 10, Equation (7) holds between the capacitance values C1 and C2 of the two capacitors and the resistance values R1 and R2 of the two resistors. Thus, in the second dead time period from when the HEMT 11 is turned off to when the flow of the rectified current is stopped, the gate drive voltage Vgs becomes a negative voltage. Accordingly, in the second dead time period, the reverse-direction current flowing through the HEMT 11 can be easily diverted to the diode 12 to reduce the switching loss.

In particular, it is preferable that Equation (8) holds between the capacitance values C1 and C2 and the resistance values R1 and R2. This makes it possible to increase the difference between the gate drive voltage VgsA immediately after the HEMT 11 is turned on and the gate drive voltage VgsB immediately before the HEMT 11 is turned off, and make the gate drive voltage Vgs a negative voltage that is sufficiently lower than 0 V in the second dead time period.

When the rectified current intermittently flows, the HEMT 11 is turned on after the rectified current starts to flow, and is turned off before the flow of the rectified current is stopped. The difference between the gate voltage and the source voltage of the HEMT 11 is lower than −0.2 V immediately after the HEMT 11 is turned off, and higher than −0.2 V immediately before the rectified current starts to flow. By making the gate drive voltage VgsB lower than −0.2 V immediately after the HEMT 11 is turned off, reverse-direction current flowing through the HEMT 11 can be easily diverted to the diode 12 to reduce switching loss. In addition, by setting the gate drive voltage Vgs when the rectified current starts to flow to higher than −0.2 V, the reverse conduction loss can be reduced.

In particular, the difference between the gate voltage and the source voltage of the HEMT 11 is preferably greater than −0.2 V after the increased current flowing through the diode 12 no longer flows by the HEMT 11 being turned off. This makes it possible to have a time margin until the timing at which the rectified current starts to flow.

In the step-up chopper circuit 40 illustrated in FIG. 9, the power supply circuit according to the present embodiment can be configured by replacing the rectifying circuit 19 according to the reference example with the rectifying circuit 10 according to the present embodiment. With the power supply circuit (step-up chopper circuit) according to the present embodiment, it is possible to reduce switching loss of the power supply circuit by using the rectifying circuit 10 in which switching loss is reduced.

Second Embodiment

In a second embodiment, a method for providing an inductor 13 on a pathway extending through the diode 12 is described among the pathways connecting the source terminal and the drain terminal of the HEMT 11. The inductor 13 can be formed by using, for example, a wiring line pattern or a lead wire of a component. According to this method, the inductor 13 can be formed without adding a new component.

However, in a case where the inductor 13 is formed by the method described above, the wiring line pattern becomes long so that the loss due to the wiring line is increased. In addition, with the method described above, resonance may occur because of the following reasons. The output capacitance 14 of the HEMT 11 is also charged by the current supplied from the drain terminal side of the HEMT 11 in addition to the current flowing from the inductor 13. The voltage between the source and drain of the HEMT 11 changes at high speed, which in turn causes the voltage between the anode and cathode of the diode 12 to change at high speed. However, because of the presence of the inductor 13, the rise of the voltage between the anode and cathode of the diode 12 is delayed in comparison with the rise of the voltage between the source and drain of the HEMT 11. Due to the rise of the voltage, the parasitic capacitance 15 of the diode 12 is charged so that the resonance occurs. When the resonance occurs, radiation noise may be generated and the diode 12 may break in some cases.

Therefore, in the present embodiment, a circuit component made of a magnetic material is provided as the inductor 13 on a pathway extending through the diode 12. The magnetic material has a property that an inductance component decreases but a resistive component increases at a frequency of equal to or higher than 100 kHz, and at a frequency of equal to or higher than 1 GHz, the resistance component also decreases. The rectifying circuit according to the present embodiment resonates, typically, at a frequency in a range from 1 MHz to 500 MHz. This makes it possible to use a resistive component made of a magnetic material. In particular, by using a ferrite material as the magnetic material, resonance can be more effectively reduced. A material suitable for the ferrite material may be selected from among manganese zinc (MnZn) based materials, nickel zinc (NiZn) based materials, and the like.

Figure 19:
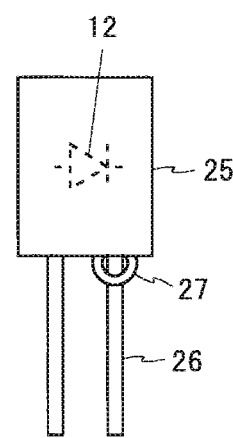
FIG. 19 is a diagram illustrating a method for providing an inductor in a rectifying circuit according to a second embodiment.

FIG. 19 is a diagram illustrating a method for providing the inductor 13. In FIG. 19, the diode 12 is built into a package 25 including two lead wires 26. By passing one of the lead wires 26 through a ferrite bead 27 made of a ferrite material, the inductor 13 can be disposed on a pathway extending through the diode 12. A component made of a magnetic material may be disposed in a similar manner on other wiring lines.

As described above, the rectifying circuit according to the present embodiment includes a component made of a magnetic material on the pathway extending through the diode 12 among the pathways connecting the source terminal and the drain terminal of the HEMT 11. Therefore, with the rectifying circuit according to the present embodiment, the inductance of the pathway extending through the diode 12 can be made larger than the inductance of the pathway extending through the HEMT 11. Moreover, since a large inductance can be formed even when the wiring line is short, the wiring line pattern can be shortened to reduce the loss caused by the wiring line.

Third Embodiment

In a third embodiment, other power supply circuits including the rectifying circuit 10 according to the first embodiment will be described. In each power supply circuit described below, the rectifying circuit 10 is provided at a position where a diode or a silicon transistor is provided in the case of a typical power supply circuit.

Figure 20:
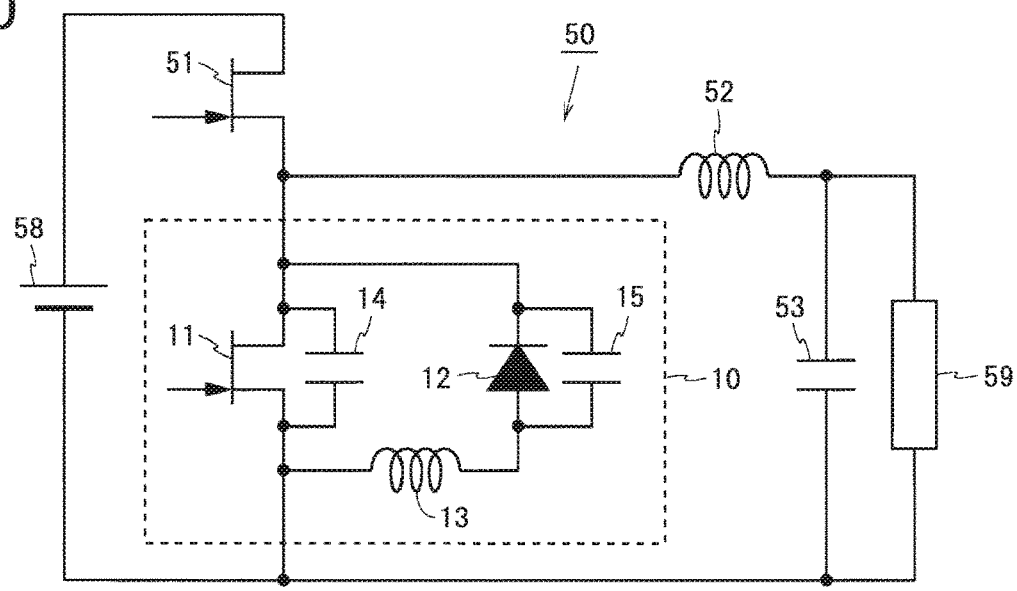
FIG. 20 is a circuit diagram of a power supply circuit (step-down chopper circuit) according to a first example of a third embodiment.

FIG. 20 is a circuit diagram of a power supply circuit (step-down chopper circuit) according to a first example. A step-down chopper circuit 50 illustrated in FIG. 20 includes the rectifying circuit 10, a switching element 51, a coil 52 and a smoothing capacitor 53, and is connected to a DC power supply 58 and a DC load 59. A drain terminal of the switching element 51 is connected to a positive electrode of the DC power supply 58. A source terminal of the switching element 51 is connected to a first terminal (a terminal on the upper side in FIG. 20) of the rectifying circuit 10 and to one end (the left end in FIG. 20) of the coil 52. The other end of the coil 52 is connected to one end (the upper end in FIG. 20) of the DC load 59. A second terminal of the rectifying circuit 10 is connected to a negative electrode of the DC power supply 58 and to the other end of the DC load 59. The smoothing capacitor 43 is disposed between both the ends of the DC load 59.

A silicon transistor, an insulated gate bipolar transistor (IGBT), a HEMT, or the like is used for the switching element 51. The rectifying circuit 10 has a function to flow a rectified current upward in the drawing. By providing the rectifying circuit 10 at the position where a diode is provided, it is possible to constitute the step-down chopper circuit 50 in which switching loss is reduced.

Figure 21:
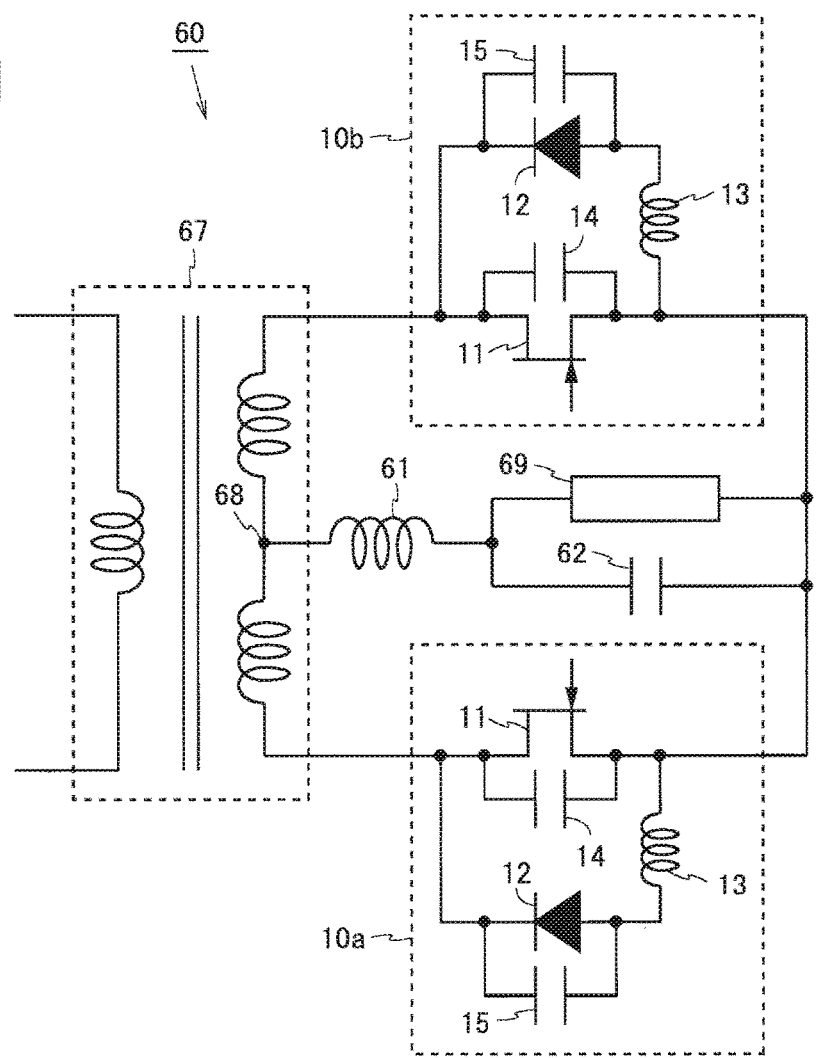
FIG. 21 is a circuit diagram of a power supply circuit (center tap rectifying circuit) according to a second example of the third embodiment.

FIG. 21 is a circuit diagram of a power supply circuit (a center tap rectifying circuit of an insulated DC/DC converter) according to a second example. In FIG. 21, a switching circuit (not illustrated) such as a full-bridge circuit or a push-pull circuit is connected to the primary side of an isolation transformer 67. The secondary winding wire of the isolation transformer 67 includes a center tap 68. A center tap rectifying circuit 60 includes two rectifying circuits 10a and 10b, a smoothing coil 61 and a smoothing capacitor 62, and is connected to both ends and the center tap 68 of the secondary winding wire of the isolation transformer 67, and to a DC load 69. A first terminal (a terminal on the left side in FIG. 21) of the rectifying circuit 10a is connected to one end (the lower end in FIG. 21) of the secondary winding wire of the isolation transformer 67. A first terminal of the rectifying circuit 10b is connected to the other end of the secondary winding wire of the isolation transformer 67. One end (the left end in FIG. 21) of the smoothing coil 61 is connected to the center tap 68. The other end of the smoothing coil 61 is connected to one end (the left end in FIG. 21) of the DC load 69. A second terminal of each of the rectifying circuits 10a and 10b is connected to the other end of the DC load 69. The smoothing capacitor 62 is disposed between both the ends of the DC load 69.

Each of the rectifying circuits 10a and 10b has a function to flow a rectified current leftward in the drawing. By providing the rectifying circuits 10a and 10b at the positions where diodes are provided, it is possible to constitute the center tap rectifying circuit 60 in which switching loss is reduced.

Figure 22:
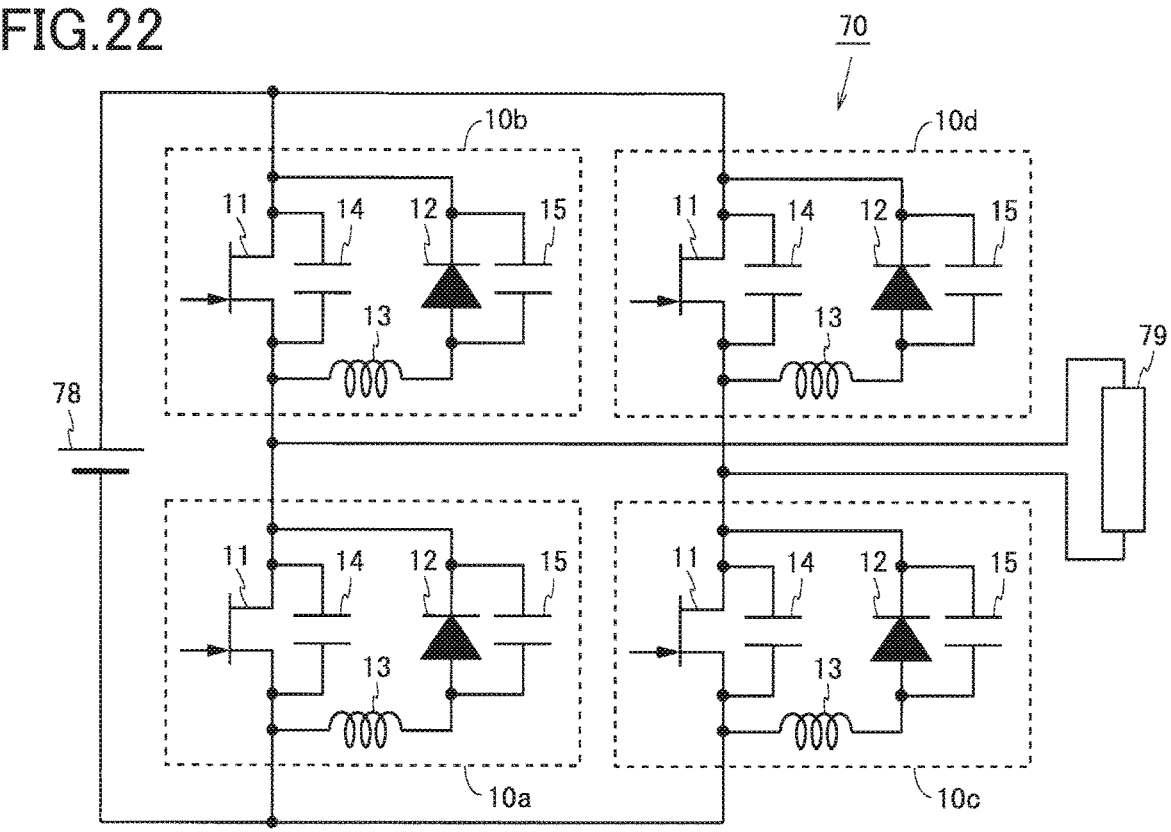
FIG. 22 is a circuit diagram of a power supply circuit (inverter circuit) according to a third example of the third embodiment.

FIG. 22 is a circuit diagram of a power supply circuit (inverter circuit) according to a third example. An inverter circuit 70 illustrated in FIG. 22 includes four rectifying circuits 10a to 10d, and is connected to a DC power supply 78 and an AC load 79. The AC load 79 includes a coil (not illustrated). A first terminal (a terminal on the upper side in FIG. 22) of each of the rectifying circuits 10b and 10d is connected to a positive electrode of the DC power supply 78. Second terminals of the rectifying circuits 10b and 10d are connected to first terminals of the rectifying circuits 10a and 10c, respectively. A second terminal of each of the rectifying circuits 10a and 10c is connected to a negative electrode of the DC power supply 78. A connection point of the rectifying circuits 10a and 10b is connected to one end (the upper end in FIG. 22) of the AC load 79, and a connection point of the rectifying circuits 10c and 10d is connected to the other end of the AC load 79.

The rectifying circuits 10a to 10d selectively perform operation as a switch and operation as a rectifying circuit. When the HEMT 11 is in an ON state with a positive voltage applied to the first terminal side, a forward current flows from the drain terminal toward the source terminal of the HEMT 11 (from the first terminal toward the second terminal of each of the rectifying circuits 10a to 10d). At this time, each of the rectifying circuits 10a to 10d operates as a switch. With a positive voltage applied to the second terminal side, the rectifying circuits 10a to 10d flow a rectified current. At this time, each of the rectifying circuits 10a to 10d operates as a rectifying circuit. By providing the rectifying circuits 10a to 10d at the positions where silicon transistors are provided, it is possible to constitute the inverter circuit 70 in which switching loss is reduced.

A three-phase inverter circuit may be constituted by adding a circuit in which two rectifying circuits 10 are connected in series to the inverter circuit 70. As a result, a three-phase inverter circuit in which switching loss is reduced may be constituted.

Figure 23:
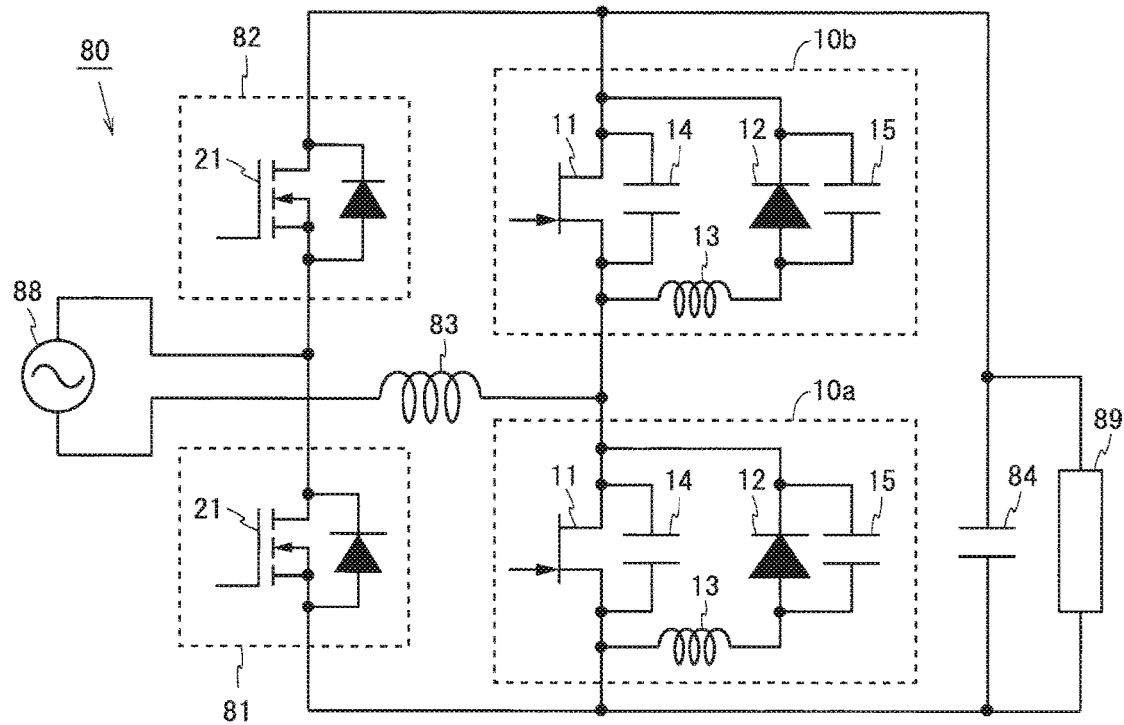
FIG. 23 is a circuit diagram of a power supply circuit (totem-pole power factor improvement circuit) according to a fourth example of the third embodiment.

FIG. 23 is a circuit diagram of a power supply circuit (totem-pole power factor improvement circuit) according to a fourth example. A totem-pole power factor improvement circuit 80 illustrated in FIG. 23 includes two silicon transistors 81 and 82, the two rectifying circuits 10a and 10b, a smoothing coil 83 and a smoothing capacitor 84, and is connected to an AC power supply 88 and a DC load 89. One end (the upper end in FIG. 23) of the AC power supply 88 is connected to a drain terminal of the silicon transistor 81 and a source terminal of the silicon transistor 82. The other end of the AC power supply 88 is connected to one end (the left end in FIG. 23) of the smoothing coil 83. The other end of the smoothing coil 83 is connected to a first terminal (a terminal on the upper side in FIG. 23) of the rectifying circuit 10a and to a second terminal of the rectifying circuit 10b. A drain terminal of the silicon transistor 82 is connected to a first terminal of the rectifying circuit 10b and to one end (the upper end in FIG. 23) of the DC load 89. A source terminal of the silicon transistor 81 is connected to a second terminal of the rectifying circuit 10a and to the other end of the DC load 89. The smoothing capacitor 84 is disposed between both the ends of the DC load 89.

The silicon transistors 81 and 82 are switched at a commercial frequency (for example, a frequency in a range from 50 Hz to 60 Hz). The rectifying circuits 10a and 10b are switched at a relatively high frequency (for example, a frequency in a range from 10 kHz to 200 kHz). The smoothing coil 83 smooths an input current and the smoothing capacitor 84 smooths an output voltage. The rectifying circuits 10a and 10b selectively perform operation as a switch and operation as a rectifying circuit. By providing the rectifying circuits 10a and 10b at the positions where silicon transistors are provided, it is possible to constitute the totem-pole power factor improvement circuit 80 in which switching loss is reduced.

The power supply circuits according to the first to fourth examples may include the rectifying circuit according to the second embodiment instead of the rectifying circuit 10 according to the first embodiment. As described above, the power supply circuit according to the present embodiment includes the rectifying circuit according to the first or second embodiment. With the power supply circuit according to the present embodiment, it is possible to reduce switching loss of the power supply circuit by using the rectifying circuit in which switching loss is reduced.

This application claims the benefit of priority to JP 2018-26852 entitled "Rectifying Circuit and Power Supply Device" filed on Feb. 19, 2018, and the entire contents of the above-identified application are hereby incorporated herein by reference.

REFERENCE SIGNS LIST

1 Gate drive power supply
2, 3 Transistor
4 Capacitor
5 Capacitor
6, 7 Resistor
10 Rectifying circuit
11 HEMT
12 Diode
13 Inductor
14 Output capacitance
15 Parasitic capacitance
16 Gate drive circuit
40 Step-up chopper circuit
50 Step-down chopper circuit
60 Center tap rectifying circuit
70 Inverter circuit
80 Totem-pole power factor improvement circuit

The invention claimed is:
1. A rectifying circuit comprising:
a high electron mobility transistor (HEMT);
a diode connected in antiparallel to the HEMT; and
a gate drive circuit,
wherein the gate drive circuit includes
a gate drive power supply,
a first transistor including a first conduction terminal connected to a positive electrode of the gate drive power supply and a second conduction terminal connected to a first node,
a second transistor including a first conduction terminal connected to the first node and a second conduction terminal connected to a negative electrode of the gate drive power supply and a source terminal of the HEMT, and configured to turn on in a complementary manner with the first transistor,
a first capacitor including an input capacitance of the HEMT, and provided between a gate terminal and the source terminal of the HEMT,
a second capacitor provided on a pathway extending through the first node and configured to charge the input capacitance,
a first resistor connected in parallel to the first capacitor, and
a second resistor connected in parallel to the second capacitor,
a forward voltage drop of the diode when the diode starts to be conductive is smaller than a voltage drop of the HEMT when the HEMT is reverse-conductive in an OFF state corresponding to an amount of rectified current when the HEMT is reverse-conductive in an ON state,
inductance of a pathway extending through the diode is larger than inductance of a pathway extending through the HEMT among the pathways connecting the source terminal and a drain terminal of the HEMT,
an amount of charge accumulated in a parasitic capacitance of the diode is smaller than an amount of charge accumulated in an output capacitance of the HEMT, and
the gate drive circuit is configured to control a gate voltage of the HEMT to make the gate voltage lower than a source voltage of the HEMT when the HEMT is turned off.
2. The rectifying circuit according to claim 1,
wherein C2/(C1+C2) >R1/(R1+R2) between capacitance values C1 and C2 and resistance values R1 and R2 where C1 is the capacitance value of the first capacitor, C2 is the capacitance value of the second capacitor, R1 is the resistance value of the first resistor, and R2 is the resistance value of the second resistor.
3. The rectifying circuit according to claim 2,
wherein C2/(C1+C2) >1.1 x R1/(R1+R2) between the capacitance values C1 and C2 and the resistance values R1 and R2.
4. The rectifying circuit according to claim 1,
wherein, when the rectified current flows intermittently,
the HEMT is configured to turn on after the rectified current starts to flow and turn off before the flow of the rectified current is stopped, and
a difference between the gate voltage and the source voltage of the HEMT is lower than −0.2 V immediately after the HEMT is turned off and higher than −0.2 V immediately, before the rectified current starts to flow.
5. The rectifying circuit according to claim 4,
wherein the difference between the gate voltage and the source voltage of the HEMT is higher than −0.2 V after an increased current flowing through the diode no longer flows by the HEMT being turned off.
6. A power supply device comprising:
the rectifying circuit according to claim 1.

* * * * *